US009264563B2

(12) United States Patent
Anezaki et al.

(10) Patent No.: US 9,264,563 B2
(45) Date of Patent: Feb. 16, 2016

(54) COMMUNICATION SYSTEM, MANAGEMENT SERVER, COMMUNICATION RELAY APPARATUS, AND RECORDING MEDIUM

(71) Applicant: Konica Minolta, Inc., Chiyoda-ku (JP)

(72) Inventors: Kazuya Anezaki, Itami (JP); Kazumi Sawayanagi, Itami (JP); Masami Yamada, Sennan-gun (JP); Shuji Yoneda, Osaka (JP); Hisashi Uchida, Kuse-gun (JP); Akihiro Torigoshi, Itami (JP); Yasutaka Ito, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/567,811

(22) Filed: Dec. 11, 2014

(65) Prior Publication Data
US 2015/0172493 A1 Jun. 18, 2015

(30) Foreign Application Priority Data

Dec. 12, 2013 (JP) .................................. 2013-257345

(51) Int. Cl.
*G06F 3/12* (2006.01)
*H04N 1/00* (2006.01)
*H04L 12/701* (2013.01)

(52) U.S. Cl.
CPC ............ *H04N 1/00891* (2013.01); *H04L 45/00* (2013.01); *H04N 1/00095* (2013.01); *H04N 1/00244* (2013.01); *H04N 2201/0015* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

2005/0243804 A1* 11/2005 Watai .................... H04L 41/06
370/352

FOREIGN PATENT DOCUMENTS

| JP | 2009-253651 A | 10/2009 |
| JP | 2011-077748 A | 4/2011 |
| JP | 2013-073578 A | 4/2013 |

* cited by examiner

*Primary Examiner* — Helen Q Zong
(74) *Attorney, Agent, or Firm* — Buchanan Ingersoll & Rooney PC

(57) ABSTRACT

A communication system includes a plurality of devices, a plurality of communication relay apparatuses, and a management server. If the management server that has received from a cloud server a request to access a specific device has no communication session with a specific communication relay apparatus that has control over the specific device, the management server transmits a tunnel connection request to a substitute apparatus (another communication relay apparatus different from the specific communication relay apparatus) via a communication session between the substitute apparatus and the management server. The substitute apparatus transfers the tunnel connection request to the specific communication relay apparatus and causes the specific communication relay apparatus to return from a power saving mode. The specific communication relay apparatus then establishes tunnel communication with the cloud server on the basis of the tunnel connection request to relay communication between the cloud server and the specific device.

27 Claims, 30 Drawing Sheets

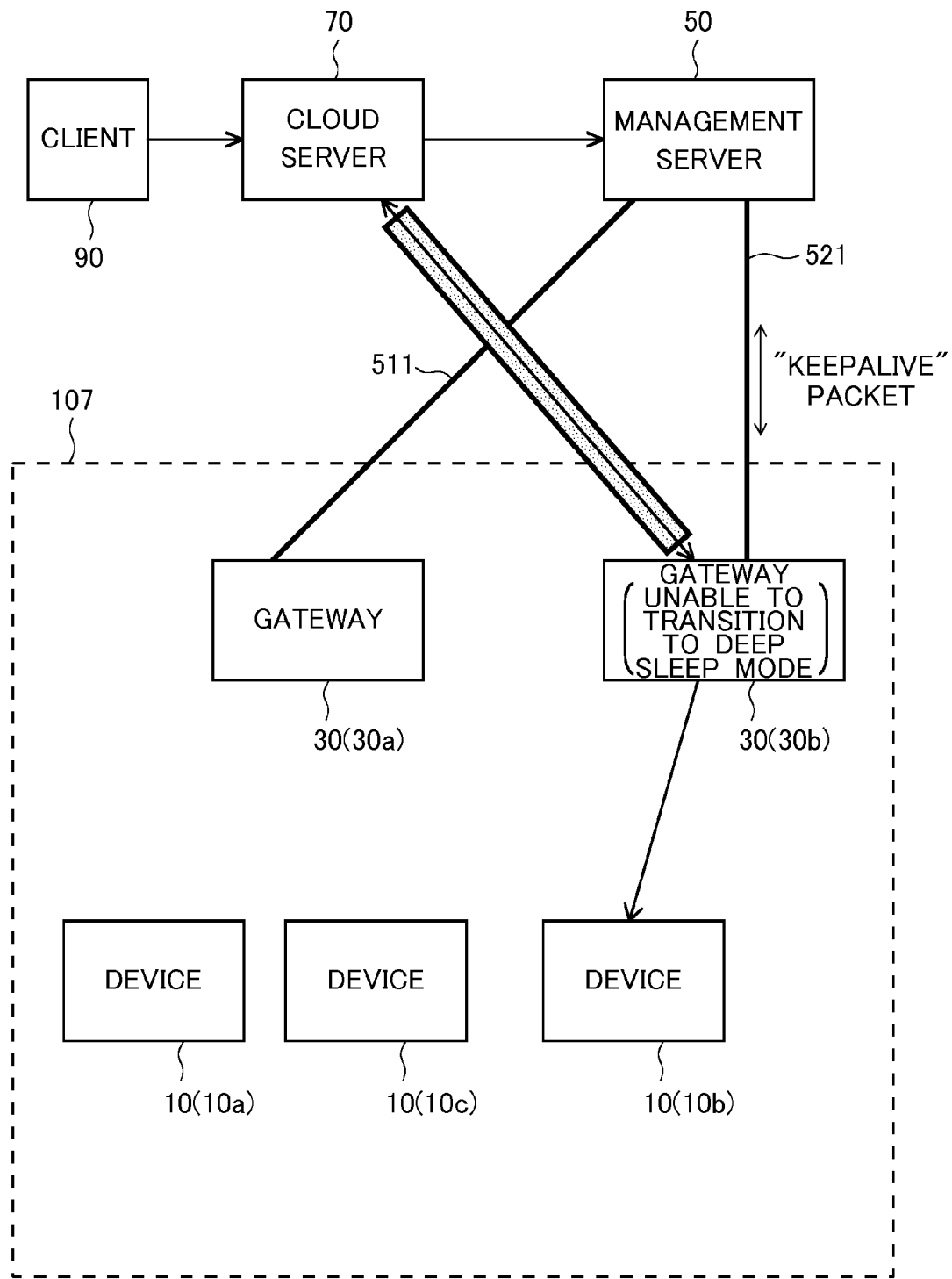

ated on Japanese Patent Application
COMMUNICATION SYSTEM, MANAGEMENT SERVER, COMMUNICATION RELAY APPARATUS, AND RECORDING MEDIUM This application is based on Japanese Patent Application No. 2013-257345 filed on Dec. 12, 2013, the contents of which are hereby incorporated by reference.

BACKGROUND OF THE INVENTION

1. Technical Field

The present invention relates to a communication system that establishes communication between a cloud server outside a LAN and a device inside the LAN, and a technique related thereto.

2. Background Art

There are techniques for interfacing between a server (cloud server) in a cloud and a device (e.g., an image forming apparatus) in a LAN.

One example is a technique for printing and outputting an electronic document stored in a server (cloud server) in a cloud, using an image forming apparatus in a local area network (LAN) (see Japanese Patent Application Laid-Open No. 2013-73578).

Japanese Patent Application Laid-Open No. 2013-73578 discloses a document output system (communication system) that includes an image forming apparatus (device), a communication relay apparatus (gateway), and a cloud server. In this system, an electronic document stored in the cloud server is transmitted to the image forming apparatus via the gateway, and printed and output by the image forming apparatus 10. Note that the gateway and the image forming apparatus (device) are provided inside the LAN, and the cloud server is provided outside the LAN.

A system such as described above has typically a firewall provided between an image forming apparatus (device) inside a LAN and a cloud server outside the LAN.

A request from the image forming apparatus inside the LAN to access the cloud server outside the LAN will pass through the firewall and will then be permitted.

On the other hand, reverse access or direct access from the cloud server outside the LAN to the image forming apparatus inside the LAN is blocked by the firewall. In other words, the cloud server cannot directly access the image forming apparatus.

In contrast, a technique is conceivable in which a message session (communication session) is established as an exception to the firewall between a management server outside a LAN and a gateway inside the LAN to allow a cloud server outside the LAN to access an image forming apparatus inside the LAN via the management server and the gateway.

FIG. 30 illustrates such a technique. Gateways 30 (30a and 30b) establish message sessions (511 and 521) with a predetermined management server 50 (see thick lines in FIG. 30) when activated, for example. When a cloud server 70 issues a request to access a specific device 10, the message session between the management server 50 and a certain gateway 30 (e.g., 30b) is used to transmit a request to establish tunnel connection (tunnel connection request) from the management server 50 to the gateway 30b. In response to the tunnel connection request, the gateway 30b establishes tunnel communication with the cloud server 70. Using the tunnel communication allows the cloud server 70 to access the device (image forming apparatus) 10 (via the gateway 30). The detail of such a technique will be described later.

This technique, however, requires the management server 50 and the gateways 30 to keep maintaining their message sessions in order to allow the gateways 30 to receive tunnel connection requests at any time from the management server 50. For example, continuous transmission of "KeepAlive" packets is necessary to maintain a message session using an extensible messaging and presence protocol (XMPP). Thus, power supply to a processor that transmits "KeepAlive" packets cannot be stopped, and the operating modes of the gateways 30 cannot transition to a specific power saving mode (e.g., a deep sleep mode in which power supply to the processor that transmits "KeepAlive" packets is stopped). In particular, in the case where there are a plurality of gateways, none of them can transition to the specific power saving mode.

As described above, in order for the plurality of gateways 30 to normally receive tunnel connection requests from the cloud server 70 via their individual message sessions with the management server 50, none of the gateways 30 can transition to a power saving mode, inhibiting a reduction in power consumption of the gateways 30 (communication relay apparatuses).

SUMMARY OF THE INVENTION

It is an object of the present invention to provide a technique that enables a communication relay apparatus being in a power saving mode in a communication system to successfully establish tunnel communication with a cloud server, and that enables a further reduction in power consumption of the communication relay apparatus.

A first aspect of the present invention is a communication system that includes a plurality of devices that are provided inside a predetermined LAN, a plurality of communication relay apparatuses that are provided inside the predetermined LAN and relay communication between the plurality of devices and a cloud server provided outside the predetermined LAN, and a management server that are provided outside the predetermined LAN and receives from the cloud server an access request to access a specific device among the plurality of devices. The plurality of communication relay apparatuses include a specific communication relay apparatus that is capable of transitioning to a power saving mode and has control over the specific device, the power saving mode being a mode in which the communication relay apparatus has no communication session with the management server, and a substitute communication relay apparatus that receives, in place of the specific communication relay apparatus, a tunnel connection request to establish tunnel connection with the cloud server, via a communication session between the substitute communication relay apparatus and the management server. In a case where the management server has received the access request from the cloud server and there is no communication session between the specific communication relay apparatus and the management server, the management server transmits the tunnel connection request to the substitute communication relay apparatus via a communication session between the substitute communication relay apparatus and the management server. The substitute communication relay apparatus that has received the tunnel connection request from the management server transfers the tunnel connection request to the specific communication relay apparatus and causes the specific communication relay apparatus to return from the power saving mode. The specific communication relay apparatus that has returned from the power saving mode establishes tunnel communication with the cloud server in response to the tunnel connection request received from the substitute communication relay apparatus, and relays communication between the cloud server and the specific device.

A second aspect of the present invention is a management server that manages communication between a cloud server provided outside a predetermined LAN and a specific device provided inside the predetermined LAN in a communication system that establishes communication between the cloud server and the specific device via one of a plurality of communication relay apparatuses that are provided inside the predetermined LAN. The management server includes a receiving unit configured to receive from the cloud server an access request to access the specific device, and a communication control unit configured to transmit a tunnel connection request to establish tunnel communication with the cloud server in response to the access request. If the management server has received the access request and there is no communication session between the management server and a specific communication relay apparatus that corresponds to the specific device, the communication control unit transmits the tunnel connection request to a substitute communication relay apparatus different from the specific communication relay apparatus via a communication session between the substitute communication relay apparatus and the management server, and causes the substitute communication relay apparatus to transfer the tunnel connection request to the specific communication relay apparatus.

A third aspect of the present invention is a non-transitory computer-readable recording medium that stores a program for causing a computer built into a management server, which manages communication between a cloud server provided outside a predetermined LAN and a specific device provided inside the predetermined LAN in a communication system that establishes communication between the cloud server and the specific device via one of a plurality of communication relay apparatuses provided inside the predetermined LAN, to execute a) receiving from the cloud server an access request to access the specific device, and b) transmitting a tunnel connection request to establish tunnel communication with the cloud server in response to the access request. The operation b) includes, if there is no communication session between the specific communication relay apparatus and the management server at a time of receipt of the access request, transmitting the tunnel connection request to a substitute communication relay apparatus different from the specific communication relay apparatus via a communication session between the substitute communication relay apparatus and the management server, and causing the substitute communication relay apparatus to transfer the tunnel connection request to the specific communication relay apparatus.

A fourth aspect of the present invention is a communication relay apparatus that acts as a substitute to perform part of an operation of a specific communication relay apparatus provided inside a predetermined LAN in a communication system that uses a management server provided outside the predetermined LAN and the specific communication relay apparatus to establish communication between a cloud server provided outside the predetermined LAN and a specific device provided inside the predetermined LAN. The communication relay apparatus includes a receiving unit configured to, in a case where the specific communication relay apparatus is in a power saving mode, receive a tunnel connection request that is destined for the specific communication relay apparatus and transmitted from the management server in response to an access request to access the specific device from the cloud server, and a communication control unit configured to, upon receipt of the tunnel connection request transmitted from the management server via a communication session between the communication relay apparatus and the management server, transfer the tunnel connection request to the specific communication relay apparatus and cause the specific communication relay apparatus to return from the power saving mode and establish tunnel communication with the cloud server to relay communication between the cloud server and the specific device.

A fifth aspect of the present invention is a non-transitory computer-readable recording medium that stores a program for causing a computer built into a communication relay apparatus, which acts as a substitute to perform part of an operation of a specific communication relay apparatus provided inside a predetermined LAN in a communication system that uses a management server provided outside the predetermined LAN and the specific communication relay apparatus to establish communication between a cloud server provided outside the predetermined LAN and a specific device provided inside the predetermined LAN, to execute a) receiving from the cloud server a tunnel connection request that is destined for the specific device and transmitted from the management server that has received an access request to access the specific device, and b) in a case where the specific communication relay apparatus is in a power saving mode and the tunnel connection request that is destined for the specific communication relay apparatus is transmitted from the management server that has received an access request to access the specific device, transmitting the tunnel connection request to the specific communication relay apparatus and causing the specific communication relay apparatus to return from the power saving mode and establish tunnel communication with the cloud server to relay communication between the cloud server and the specific device.

A sixth aspect of the present invention is a communication relay apparatus in a communication system that uses a management server provided outside a predetermined LAN and the communication relay apparatus provided inside the predetermined LAN to establish communication between a cloud server provided outside the predetermined LAN and a specific device provided inside the predetermined LAN. The communication relay apparatus includes an operation control unit configured to control an operating mode of the communication relay apparatus, the operating mode including a normal mode and a power saving mode that requires lower power consumption than the normal mode, and a communication control unit configured to transmit an advance substitute request to a substitute communication relay apparatus different from the communication relay apparatus before transition to the power saving mode, the advance substitute request being a request to receive a tunnel connection request in place of the communication relay apparatus and transfer the tunnel connection request to the communication relay apparatus, the tunnel connection request being a request to establish tunnel connection with the cloud server.

A seventh aspect of the present invention is a non-transitory computer-readable recording medium that stores a program for causing a computer built into a communication relay apparatus in a communication system, which uses a management server provided outside a predetermined LAN and the communication relay apparatus provided inside the predetermined LAN to establish communication between a cloud server provided outside the predetermined LAN and a specific device provided inside the predetermined LAN, to execute a) transmitting an advance substitute request to a substitute communication relay apparatus different from the communication relay apparatus, the advance substitute request being a request to receive a tunnel connection request in place of the communication relay apparatus and transfer the tunnel connection request to the communication relay apparatus, the tunnel connection request being a request to establish tunnel connection with the cloud server, and b) after the operation a), causing the operating mode of the communication relay apparatus to transition to a power saving mode that requires lower power consumption than in a normal mode.

These and other objects, features, aspects and advantages of the present invention will become more apparent from the following detailed description of the present invention when taken in conjunction with the accompanying drawings.

BRIEF DESCRIPTION OF THE DRAWINGS

FIG. 30 illustrates a technique according to a comparative example.

DESCRIPTION OF EMBODIMENTS

Embodiments of the present invention will now be described below with reference to the drawings.

1. First Embodiment 1-1. Overview of System Configuration

Figure 1:
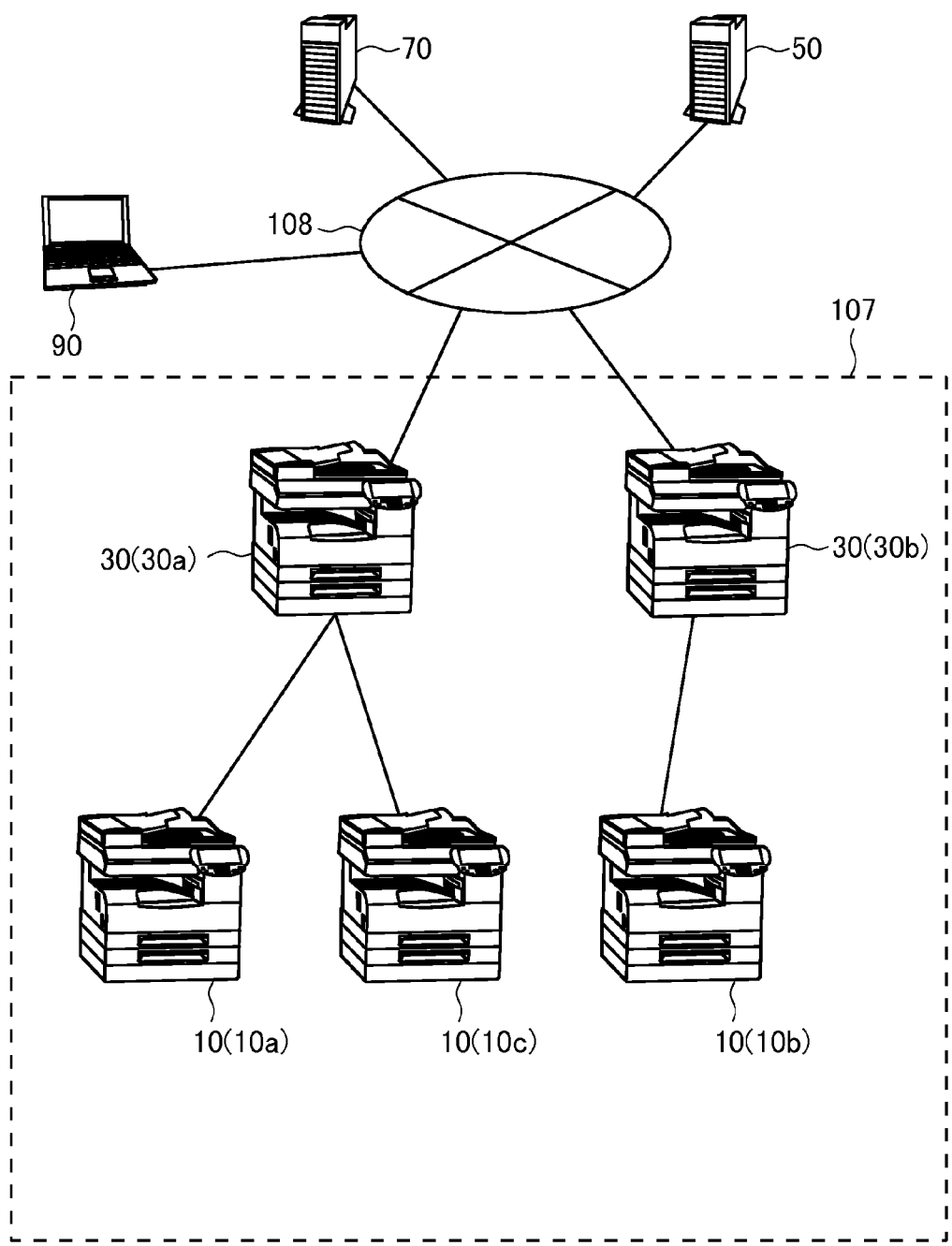
FIG. 1 illustrates an overall configuration of a communication system according to an embodiment of the present invention.

FIG. 1 illustrates an overall configuration of a communication system 1 according to an embodiment of the present invention. As illustrated in FIG. 1, the communication system 1 includes a plurality of devices 10 (10a, 10b, and 10c) and a plurality of gateways 30 (30a and 30b). The communication system 1 further includes a management server computer (hereinafter, simply referred to as a "management server") 50, a cloud server computer (hereinafter, simply referred to as a "cloud server") 70, and a client computer (hereinafter, simply referred to as a "client") 90.

The constituent elements 10, 30, 50, 70, and 90 are connected to one another via a network 108 and are capable of network communication. Note that the network 108 may be of any configuration, including a local-area network (LAN), a wide-area network (WAN), and the Internet. A form of connection to the network 108 may be a wired connection or a wireless connection.

The devices 10 and the gateways 30 are provided inside a LAN 107 that is installed in a company, for example. The management server 50, the cloud server 70, and the client 90 are provided outside the LAN 107. Alternatively, the client 90 may be provided inside the LAN 107.

Here, an example is given in which the devices 10 are Multi-Functional Peripherals (simply referred to as an "MFPs"). The MFPs are also called image forming apparatuses or communication devices.

The gateways 30 are constructed by MFPs that are different from the MFPs serving as the devices 10. Specifically, the gateways 30 are implemented by executing software (or a program) installed in the MFPs as an example of hardware.

The management server 50, the cloud server 70, and the client 90 are constructed by, for example, personal computers.

In this communication system 1, for example a print instruction transmitted from the client 90 to the cloud server 70 is transmitted to a device (MFP) 10 via the management server 50 and a gateway 30, and printed and output by the device 10.

The gateways (communication relay apparatuses) 30 have a function of relaying communication between the devices 10 and the cloud server 70.

The management server 50 is a device that manages communication between the cloud server 70 and the gateways 30, for example. The management server 50 receives a request to access a specific device among the devices 10 from the cloud server 70, and in response to the access request, transmits a request to establish tunnel connection with the cloud server 70 to one of the gateways 30.

1-2. Overview of MFP Configuration

Figure 2:
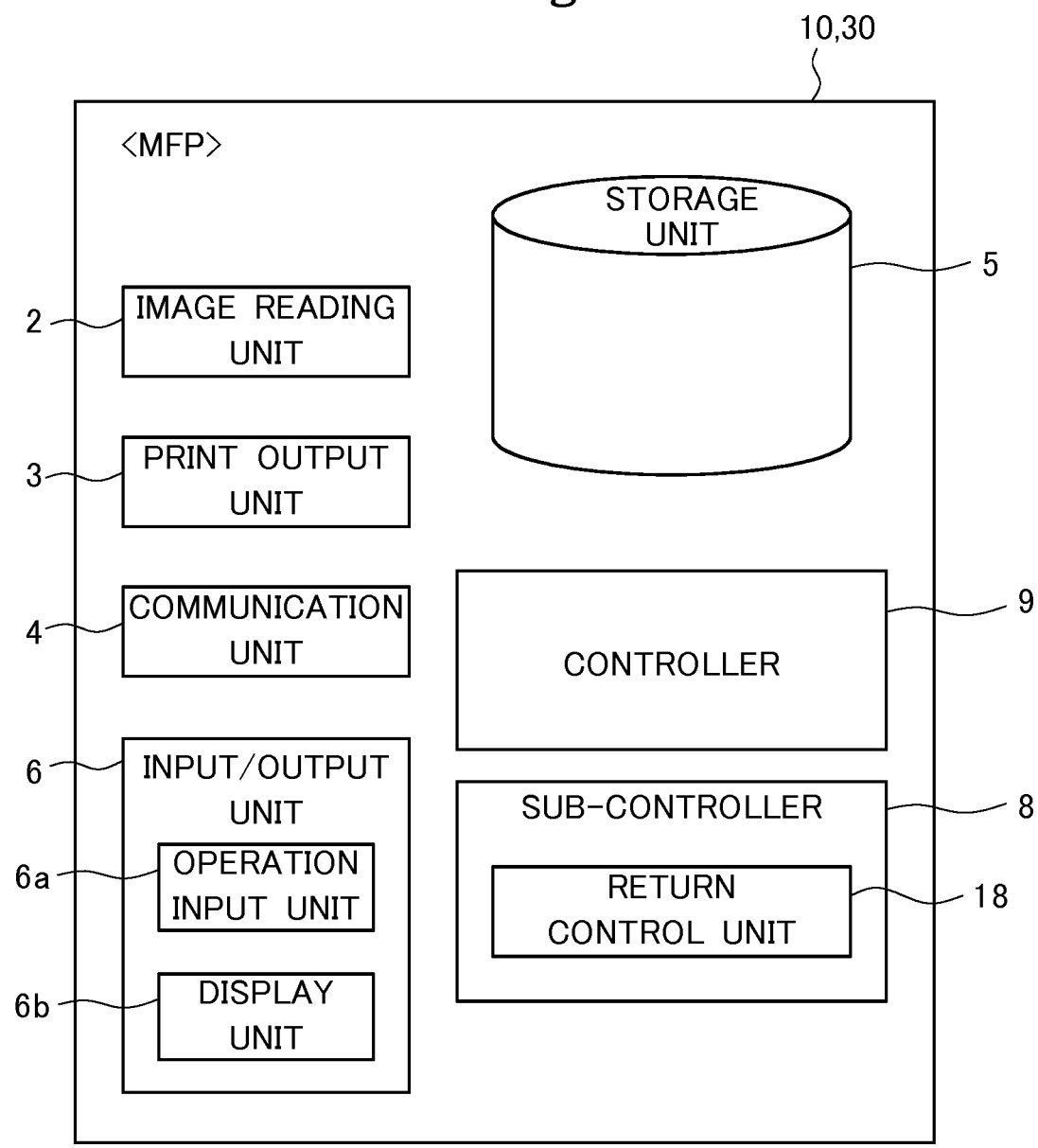
FIG. 2 is a schematic diagram illustrating a configuration of an MFP.

FIG. 2 is a schematic diagram illustrating a configuration of an MFP. The MFP is a device (also, referred to as a "Multi-Functional Peripheral") that has various functions, including a scan function, a print function, a copy function, and a data communication function.

As illustrated in FIG. 2, the MFP includes, for example, an image reading unit 2, a print output unit 3, a communication unit 4, a storage unit 5, an input/output unit 6, and a controller 9, and implements various functions by operating these units in combination.

The image reading unit 2 is a processing unit that optically reads an original document placed at a predetermined position on the MFP and generates image data of the original document (also referred to as an "original image").

The print output unit 3 is an output unit that prints out an image on various types of media such as paper on the basis of the image data of a target image.

The communication unit 4 is a processing unit capable of facsimile communication via a public network or the like. The communication unit 4 is also capable of network communication via the network 108. The network communication uses various types of protocols, including TCP/IP (Transmission Control Protocol/Internet Protocol) and FTP (File Transfer Protocol). Using the network communication allows the MFP to exchange various types of data with a desired destination (e.g., a gateway 30, the management server 50, or the cloud server 70).

To be specific, the communication unit 4 of the gateway (MFP) 30 is capable of communicating with the management server 50 (in particular, receiving data from the management server 50), using a later-described message session established between the gateway 30 and the management server 50. The communication unit 4 of the device (MFP) 10 is also capable of communicating with the cloud server 70 (in particular, receiving data from the cloud server 70) via a gateway 30, using later-described tunnel connection established between the gateway 30 and the cloud server 70. Note that the communication unit 4 includes a transmission unit that transmits data or the like to other devices, and a reception unit that receives data or the like from other devices.

The storage unit 5 is configured as a storage device such as a hard disk drive (HDD) or a nonvolatile memory.

The input/output unit 6 includes an operation input unit 6a that accepts input to the MFP 10, and a display unit 6b that displays and outputs various types of information. The input/output unit 6 is also referred to as an "operation unit."

The controller 9 is a control unit that centrally controls the MFP, and includes a CPU and various types of semiconductor memories (e.g., a RAM and a ROM).

The controller 9 implements various types of processing units by the CPU executing a predetermined software program (hereinafter, simply referred to as a "program") stored in a ROM (e.g., an EEPROM). For example, the controller 9 of the MFP serving as a gateway 30 implements various processing units, including a communication control unit 41, an information collecting unit 45, and an operation control unit 47, which will be described later with reference to FIG. 3. The controller 9 of the MFP serving as only a device 10 may include the same processing units, but it does not necessarily have to include a processing unit that is required when the MFP serves as a gateway 30. Note that the program may be recorded in any type of portable recording medium (e.g., an USB memory), or in other words, any type of non-transitory computer-readable recording medium, and installed into the MFP via the recording medium. Alternatively, the program may be downloaded via the network 108 or the like and installed into the MFP. Part of the communication control unit 41 (in particular, a processing unit that is related to a return from a sleep state) is implemented by also using a sub-controller 8 (see FIG. 2).

The gateway (MFP) 30 has three operating modes: a normal mode and two-step sleep modes including a first-step sleep mode (simple sleep mode) and a second-step sleep mode (deep sleep mode).

Among these three modes, the normal mode has the highest power consumption, and the deep sleep mode has the lowest power consumption. For example, the MFP in the simple sleep mode stops power supply to the print output unit 3 and the image reading unit 2, whereas the MFP in the deep sleep mode stops not only power supply to the print output unit 3 and the image reading unit 2 but also power supply to the controller (main controller) 9 and other units. In the deep sleep mode, the MFP supplies power to part of the communication unit 4 and the sub-controller 8 that includes a return control unit (including a return communication control unit) that controls a return operation from the sleep state, and stops power supply to the other processing units. Thus, the MFP in the deep sleep mode can perform neither communication operations using message sessions nor communication operations using tunnel connection.

1-3. Overview of Configurations of Constituent Elements

Figure 3:
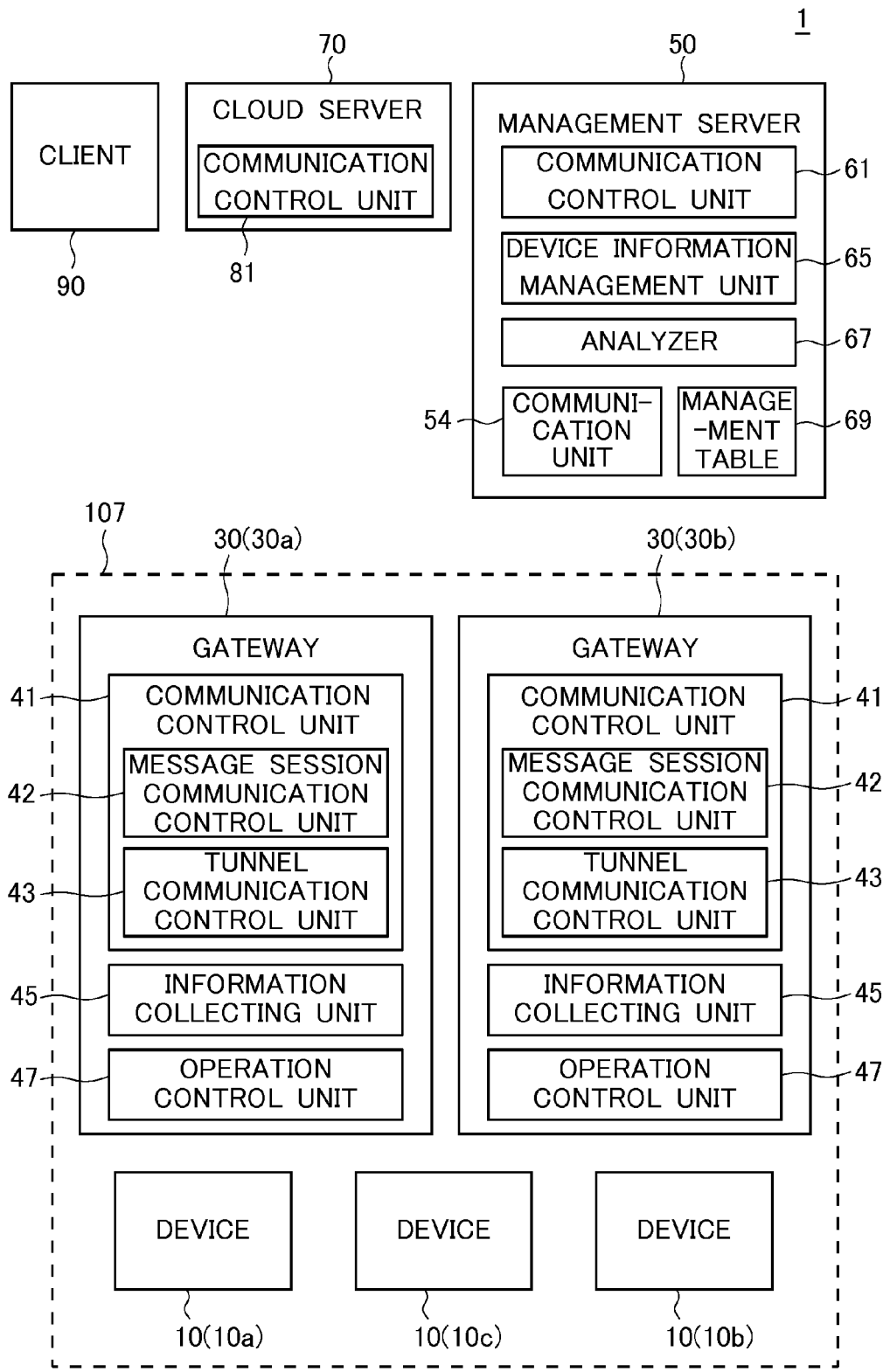
FIG. 3 illustrates overall configurations of devices including a gateway and a management server.

FIG. 3 illustrates overall configurations of the constituent elements, including 30, 50, and 70. These constituent elements will now be described with reference to FIG. 3.

Cloud Server 70

The cloud server 70 includes a communication control unit 81. The communication control unit 81 communicates with the management server 50. The communication control unit 81 also communicates with each gateway 30, using tunnel communication, which will be described later.

Management Server 50

The management server 50 includes various processing units, including a communication control unit 61, a device information management unit 65, and an analyzer 67.

These processing units are implemented by the CPU of the management server 50 executing a predetermined software program (simply referred to as a "program") stored in a storage unit (e.g., an HDD). Note that the program may be recorded in any type of portable recording medium (e.g., a DVD-ROM), or in other words, any type of non-transitory computer-readable recording medium, and installed into the management server 50 via the recording medium. Alternatively, the program may be downloaded via the network 108 or the like and installed into the management server 50.

The communication control unit 61 cooperates with a communication unit 54 (communication hardware) and controls various communication operations. For example, the communication control unit 61 communicates with the cloud server 70 to receive an access request from the cloud server 70. The communication control unit 61 also communicates with each gateway 30, using a message session, which will be described later. Note that the communication unit 54 includes a transmission unit that transmits data or the like to other devices, and a reception unit that receives data or the like from other devices.

The device information management unit 65 is a processing unit that manages device information (and a management table 69 including the device information) received from the gateways 30. The management table 69 stores, for example, a relationship between the gateways 30 and devices that are under the control of the gateways 30. Note that the management table 69 is stored in a storage unit (e.g., HDD) of the management server 50.

The analyzer 67 is a processing unit that analyzes content of the access request received from the cloud server 70.

Gateway 30

The gateways 30 each include various processing units, including the communication control unit 41, the information collecting unit 45, and the operation control unit 47. The various processing units are implemented by the controller 9 and the sub-controller 8 of the gateway 30 (MFP) executing a predetermined program.

The communication control unit 41 is a processing unit that controls communication with other devices. The communication control unit 41 includes a message session communication control unit 42 and a tunnel communication control unit 43.

The message session communication control unit 42 is a processing unit that communicates with the management server 50, using a later-described message session. The message session communication control unit 42 establishes a later-described message session with the management server 50 to communicate with the management server 50. The message session communication control unit 42 can also be called a unit for communication with the management server (or a management server communication unit).

The tunnel communication control unit 43 is a processing unit that communicates with the cloud server 70, using later-described tunnel communication. The tunnel communication control unit 43 establishes tunnel communication with the cloud server 70 and relays communication between the cloud server 70 and a specific device 10. The tunnel communication control unit 43 can also be called a unit for communication with the cloud server (or a cloud server communication unit).

As will be described later, using a message session allows a device (management server 50) outside the LAN 107 to transmit data to a device (gateway 30) inside the LAN 107. Also, using tunnel connection allows a device (cloud server 70) outside the LAN 107 to transmit data to devices (gateway 30 and device 10) inside the LAN 107.

The information collecting unit 45 is a processing unit that collects information regarding devices 10 that are under the control of the gateway 30.

The operation control unit 47 is a processing unit that controls the operating mode of the own device (gateway 30). Specifically, the operation control unit 47 controls the operating mode (the normal mode, the simple sleep mode, or the deep sleep mode) of the MFP serving as the gateway 30.

1-4. Overview of Operations

In the present embodiment, a case is also conceivable in which a message session is established (as an exception to the firewall) between the management server 50 outside the LAN and a gateway 30 inside the LAN, and the cloud server 70 outside the LAN accesses an image forming apparatus inside the LAN via the management server 50 and the gateway 30, as described previously (see FIG. 30). The following describes such operations (basic operations).

As described previously (see FIG. 30), the gateways 30 establish communication sessions, or specifically message sessions (511 and 521), with the predetermined management server 50 when activated. When the cloud server 70 has issued a request to access a specific device 10, the management server 50 uses a message session (521) established between the management server 50 and the corresponding gateway 30 (30b) to transmit a tunnel connection request to the gateway 30b. In response to the tunnel connection request, the gateway 30b establishes tunnel communication with the cloud server 70. Then, the cloud server 70 uses this tunnel communication to access the device (image forming apparatus) 10 (via the gateway 30). Note that the tunnel communication can also be called communication using a virtual private network (VPN).

More specifically, the gateways 30 each transmit a request to connect a message session to the predetermined management server 50 (establishment request) when activated. If the management server 50 approves the establishment request, a message session (511, 521) is established between the gateway 30 and the management server 50. In other words, a message session is established in response to the access from a gateway 30 inside the LAN 107 to the management server 50 outside the LAN 107. One example is a message session (communication session) using a protocol such as XMPP (extensible messaging and presence protocol). The gateways 30 also transmit information (management information) regarding devices (image forming apparatuses) that are under the control of the gateways 30, to the management server 50.

The cloud server 70 uses the message sessions between the management server 50 and the gateways 30 to access the devices (image forming apparatuses) 10.

To be specific, the cloud server 70 when accessing (communicating with) a specific device 10b transmits a request to access the specific device 10b to the management server 50.

The management server 50 specifies a gateway 30 that corresponds to the specific device 10b (e.g., a specific gateway 30b that has control over the specific device 10) on the basis of the management information. The management server 50 also transmits a tunnel connection request to the specified gateway 30.

For example, when the cloud server 70 has transmitted a request to access the specific device 10b to the management server 50, the management server 50 specifies a gateway (30b) corresponding to the specific device 10b on the basis of the management information. If there is a message session 521 between the management server 50 and the specific gateway 30b (corresponding to the specific device 10b), the management server 50 transmits a tunnel connection request to the specified gateway 30b via the message session 521. Here, the "tunnel connection request" is a connection request (establishment request) to establish tunnel connection with the cloud server 70. When the message session 521 has already been established between the management server 50 and the specific gateway 30b, the management server 50 uses the message session 521 to transmit the tunnel connection request.

Upon receipt of and in response to the tunnel connection request, the gateway 30 transmits a request to establish a hypertext transfer protocol (HTTP) session, or more specifically a hypertext transfer protocol secure (HTTPS) session, to the cloud server 70. If the cloud server 70 approves the establishment request, tunnel connection (tunnel communication) is established between the gateway 30 and the cloud server 70 via the HTTP session. In other words, the tunnel connection (tunnel communication) is established in response to the access from the gateway 30 inside the LAN 107 to the cloud server 70 outside the LAN 107. Using this tunnel communication via the HTTP session allows the cloud server 70 to transmit various types of data to the device 10 via the gateway 30. The request to establish an HTTP (HTTPS) session is also referred to as a request to establish tunnel connection. Note that FIG. 30 schematically indicates such "tunnel communication" by a long and slender rectangle shaded with dots.

Incidentally, the above-described technique for maintaining the message sessions between the management server 50 and the gateways 30 requires continuous transmission of signals (e.g., "KeepAlive" packets) to maintain the message sessions (e.g., 521) (see FIG. 30). This prevents all of the gateways 30 from transitioning to a predetermined power saving mode (e.g., a deep sleep mode in which power supply to a processing unit such as the main controller 9 that controls operations of transmitting KeepAlive packets is stopped).

Figure 10:
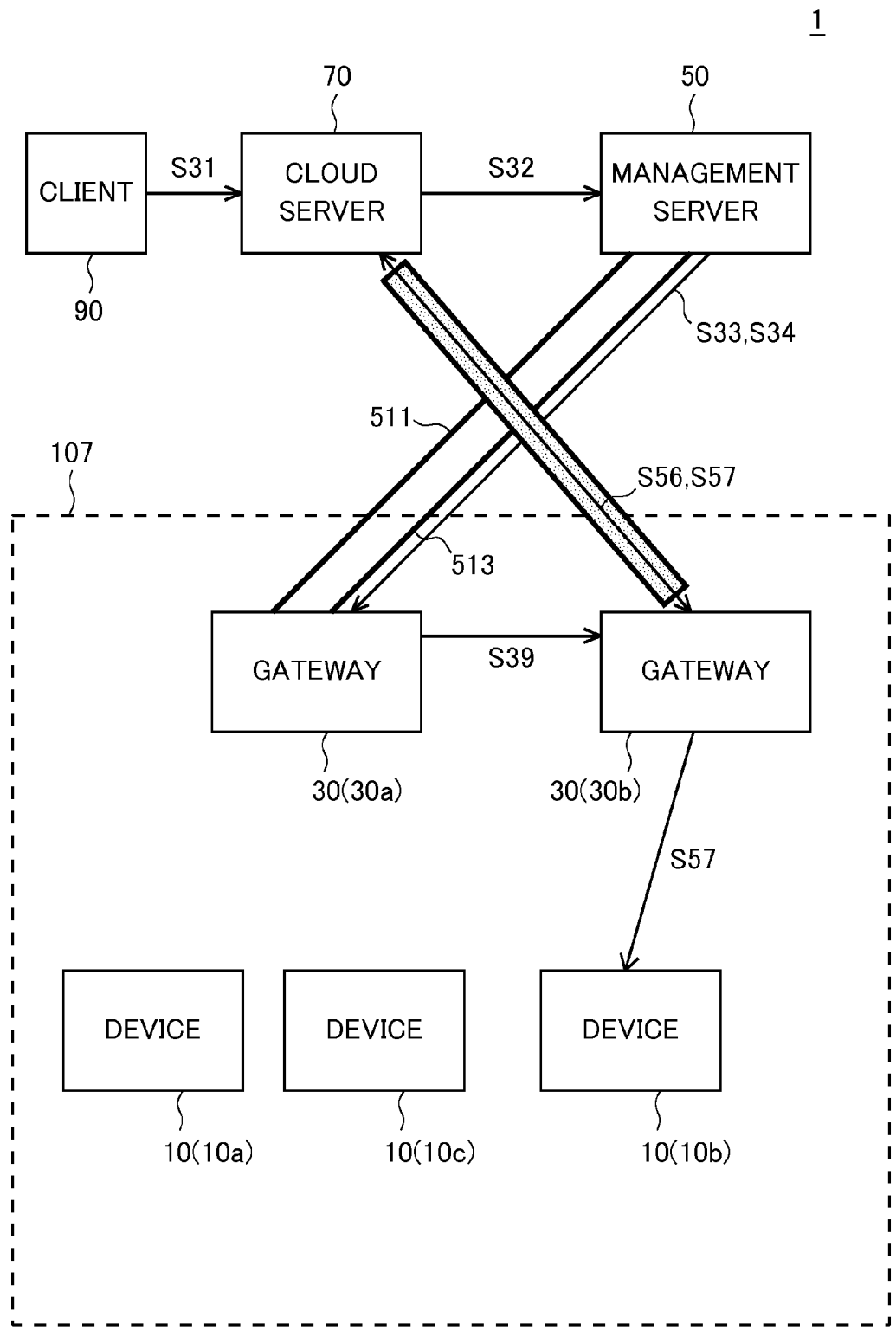
FIG. 10 is a conceptual diagram illustrating the operations in FIG. 8.

In view of this, the present embodiment describes a technique that allows a certain gateway 30b among a plurality of gateways 30 to transmission to a power saving mode (deep sleep mode) (see FIG. 6), and allows another gateway 30 (e.g., a gateway 30a) to receive a tunnel connection request from the management server 50 in place of the gateway 30b (see FIG. 10).

Specifically, when the management server 50 that has received from the cloud server 70 a request to access the device 10b has no message session with the specific gateway 30b corresponding to the device 10b (see FIGS. 6 and 7), the management server 50 considers that the specific gateway 30b is currently in the power saving mode, and performs the following processing. That is, as illustrated in FIG. 10, the management server 50 transmits the tunnel connection request to another gateway 30a (also referred to as a "substitute gateway") in place of the gateway 30b via a message session between the substitute gateway 30a and the management server 50.

Upon receiving the tunnel connection request from the management server 50, the substitute gateway 30a transfers the tunnel connection request to the specific gateway 30b and causes the specific gateway 30b to return from the power saving mode.

The specific gateway 30b that has returned from the power saving mode establishes tunnel connection with the cloud server 70 on the basis of the tunnel connection request received from the substitute gateway 30a, and relays communication between the cloud server 70 and the specific device 10b.

The following is a more detailed description of these operations.

1-5. Transition to Deep Sleep Mode

Figure 4:
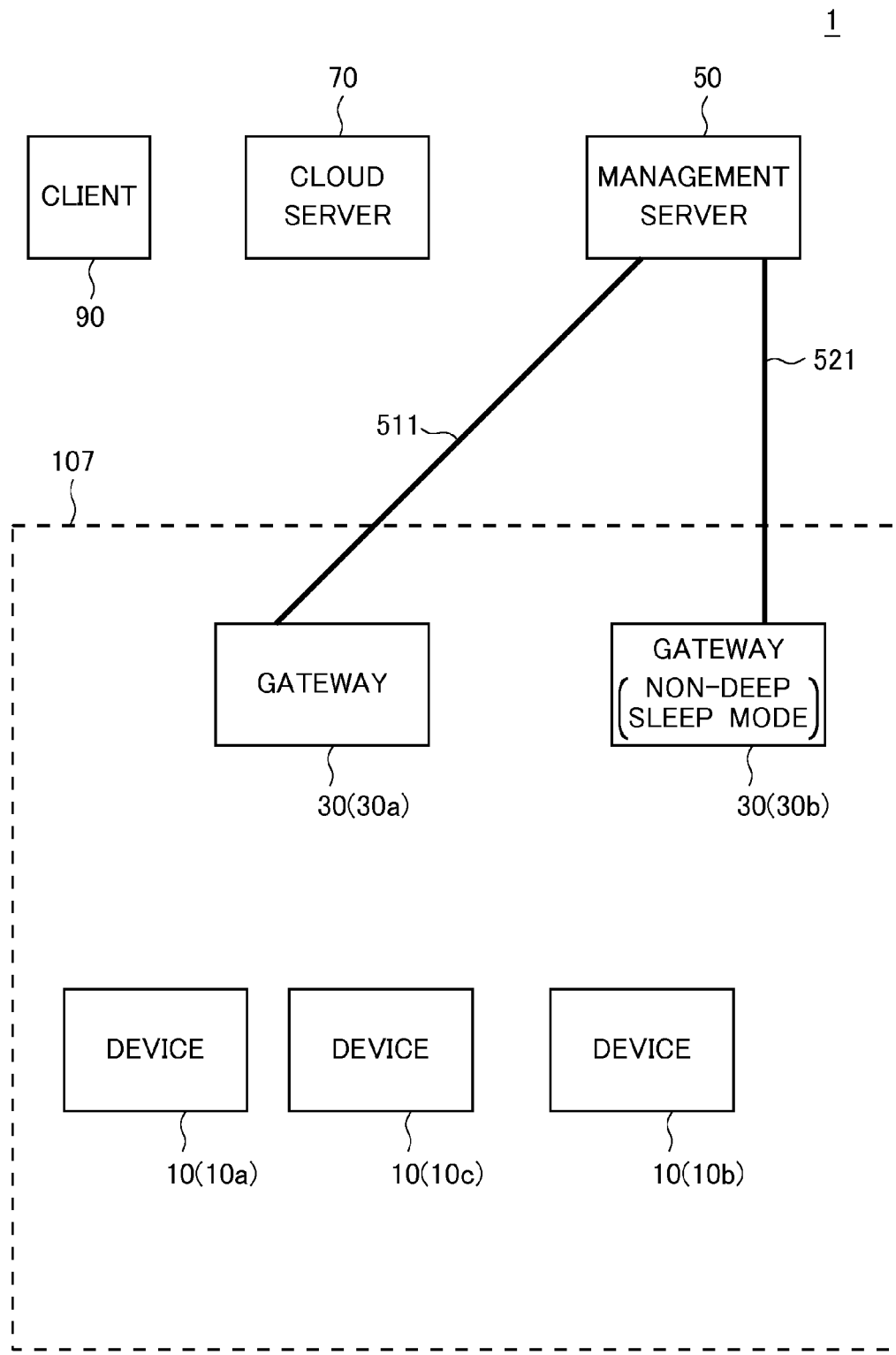
FIG. 4 illustrates a state in which a plurality of gateways have established message sessions with the management server.

FIG. 4 illustrates a state in which message sessions (511 and 521) are established between the plurality of gateways 30 (30a and 30b) and the management server 50. Assume here that the gateways 30a and 30b are both operating in the normal mode (non-power saving mode).

The message sessions between the gateways 30 and the management server 50 are established when the gateways 30 are activated, as described above. When activated, the gateways 30 (information collecting units 34) also acquire information regarding devices 10 that are under the control of the gateways 30. The gateways 30 transmit this information to the management server 50. The management server 50 then stores management information 310 that includes the above information in the management table 69 (69a).

Figure 11:
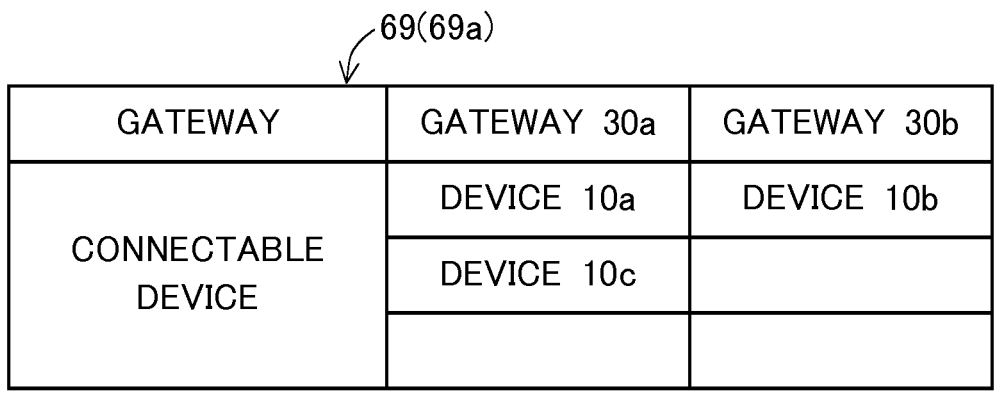
FIG. 11 illustrates a management table according to a first embodiment.

FIG. 11 illustrates the management table 69 (69a) according to the first embodiment.

As illustrated in FIG. 11, the management information 310 defines a correspondence relationship (also referred to as a "master relationship" or a "master-slave relationship") between the plurality of gateways 30 and the plurality of devices 10. Specifically, the management information 310 defines information regarding devices 10 that are under the control of the gateways 30. For example, the management information 310 defines that the gateway 30a has control over the devices 10a and 10c, and the gateway 30b has control over the device 10b.

The management server 50 is capable of determining a gateway 30 corresponding to each device 10 (i.e., a gateway 30 that has control over each device 10) on the basis of this management information 310. For example, the gateway 30a is determined as a gateway corresponding to the device 10a, and the gateway 30b is determined as a gateway corresponding to the device 10b.

In the state in FIG. 4, the management server 50 has a message session 511 with the gateway 30a that corresponds to the device 10a (a message session between the management server 50 and the gateway 30a). Thus, the management server 50 that has received an access request (a request to access the device 10a) from the cloud server 70 can use this message session 511 to transmit a tunnel connection request to the gateway 30a. In response to the tunnel connection request, the gateway 30a establishes an HTTP session (tunnel communication) with the cloud server 70. Using this tunnel communication achieves communication from the cloud server 70 to the device 10a that is under the control of the gateway 30a, via the gateway 30a.

Similarly, in the state in FIG. 4, the management server 50 has the message session 521 with the gateway 30b that corresponds to the device 10b (the message session between the management server 50 and the gateway 30b). Thus, the management server 50 that has received an access request (a request to access the device 10b) from the cloud server 70 can use this message session 521 to transmit a tunnel connection request to the gateway 30b. In response to the tunnel connection request, the gateway 30b establishes an HTTP session (tunnel communication) with the cloud server 70. Using this tunnel communication achieves communication from the cloud server 70 to the device 10b that is under the control of the gateway 30b, via the gateway 30b.

Figure 5:
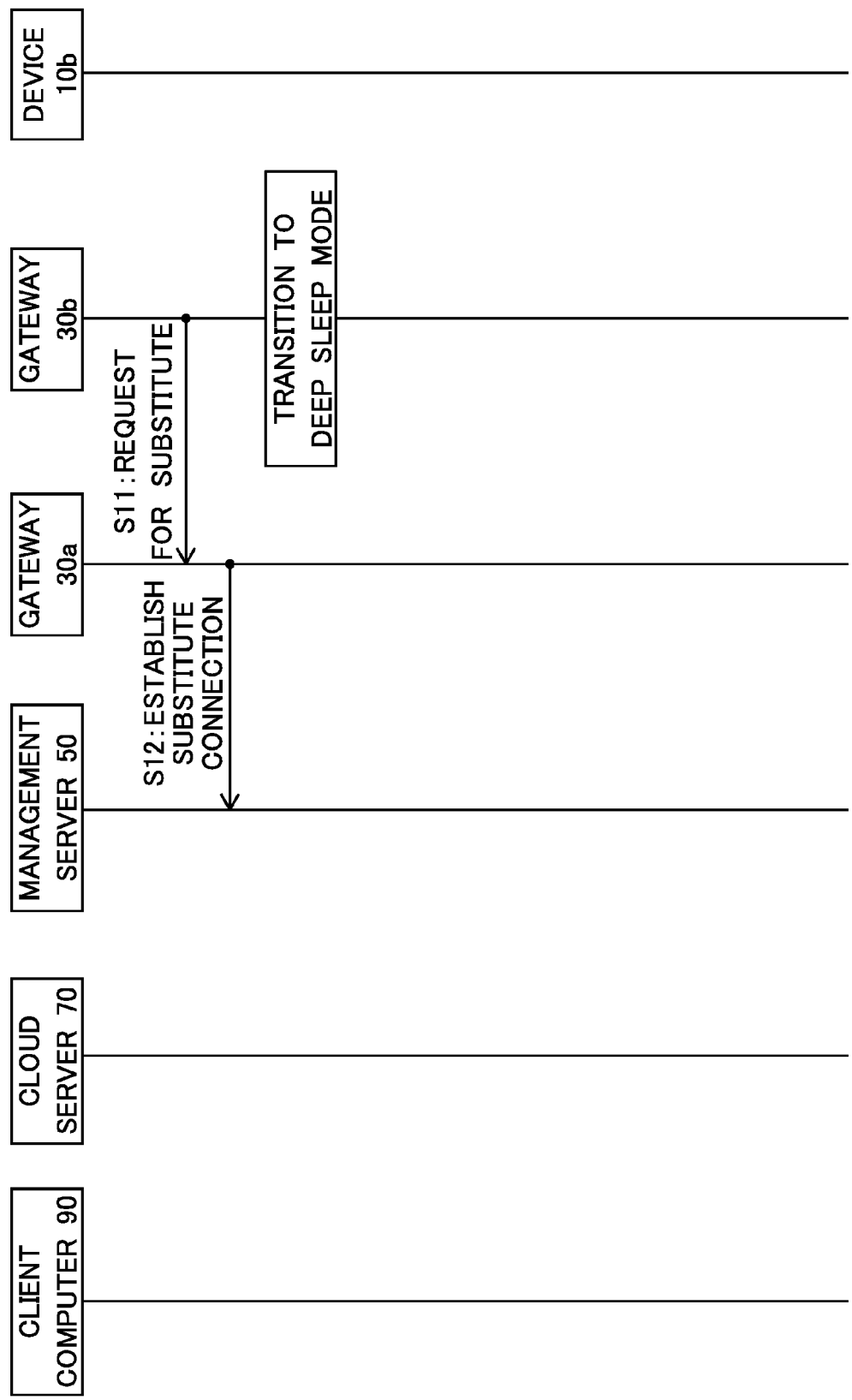
FIG. 5 is a timing chart of operations performed by the communication system when a gateway transitions to a deep sleep mode.
Figure 6:
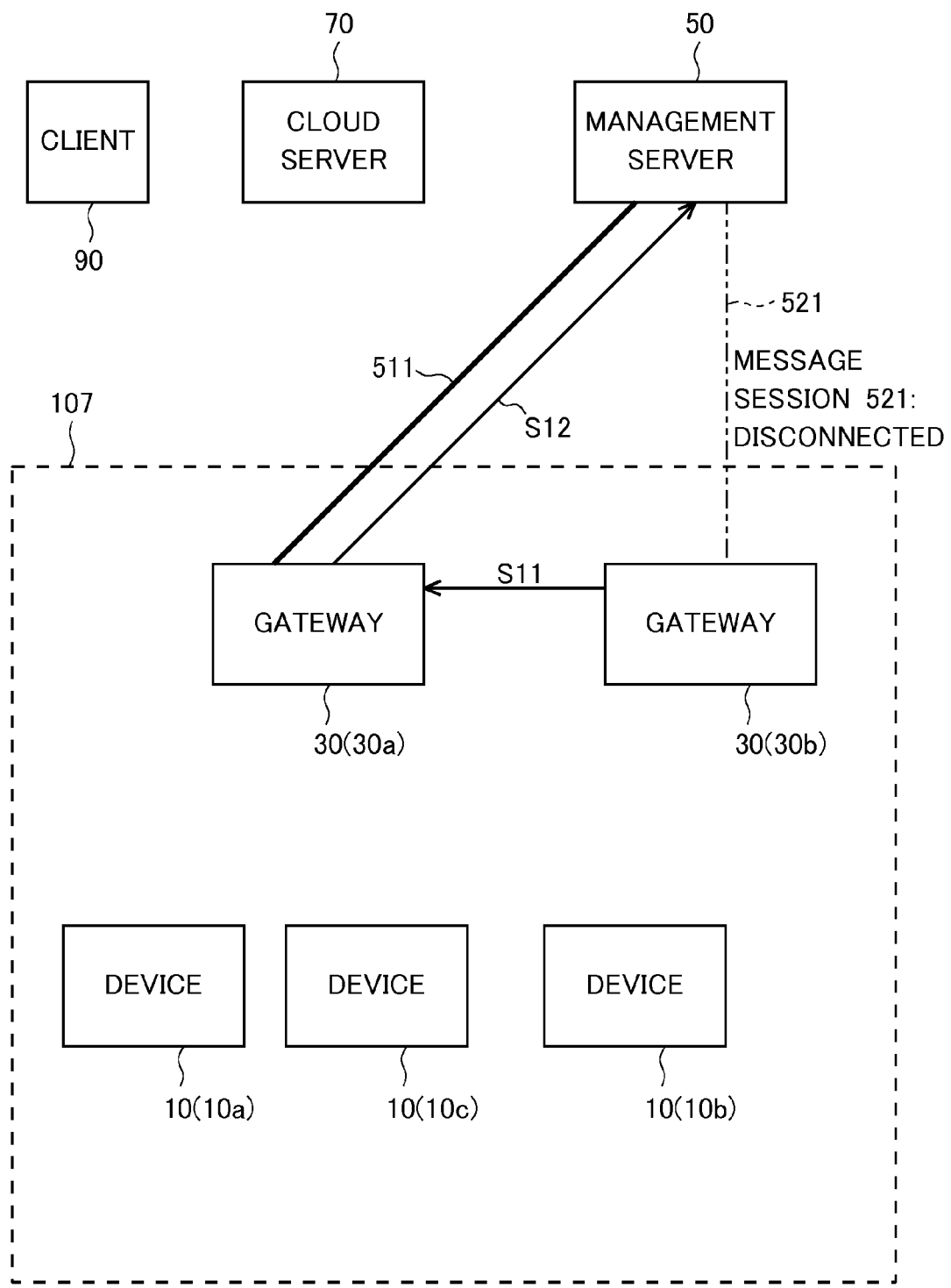
FIG. 6 is a conceptual diagram illustrating the operations in FIG. 5.

Thereafter, the gateway 30b performs operations as illustrated in FIG. 5 and transitions to the power saving mode. The following describes operations performed by the communication system 1 when the gateway 30b transitions to another operating state, i.e., the power saving mode (here, the deep sleep mode), with reference to FIGS. 5 and 6. FIG. 5 is a timing chart of these operations. FIG. 6 is a conceptual diagram illustrating operations performed by the communication system 1 when the gateway 30b transitions to the deep sleep mode.

As illustrated in FIG. 5, the gateway 30b (communication control unit 41) transmits an advance substitute request (simply referred to as a "substitute request") to the gateway 30a when transitioning to the deep sleep mode (step S11). The advance substitute request is an instruction to request the gateway 30a to receive a tunnel connection request destined for the gateway 30b in place of the gateway 30b (i.e., an instruction to request substitute reception) after the gateway 30b has transitioned to the deep sleep mode. Here, the advance substitute request also includes an instruction to transfer the tunnel connection request to the gateway 30b.

After having transmitted the advance substitute request to the gateway 30a, the gateway 30b (operation control unit 47) transitions to the deep sleep mode. This causes the message session 521 between the gateway 30b and the management server 50 to be disconnected (see FIG. 6). In this way, the gateway 30b transitions to the power saving mode (deep sleep mode) without maintaining a message session with the management server 50.

On the other hand, the gateway 30a that has received the advance substitute request from the gateway 30b establishes a new message session 513 with the management server 50, the message session 513 being different from the existing message session 511 with the management server. Specifically, the new substitute message session 513 to be used as a substitute is established between the gateway 30a and the management server 50, using a predetermined protocol (here, an extensible messaging and presence protocol, or XMPP) (see step S12 in FIG. 5 and FIG. 7). More specifically, the gateway 30a requests the management server 50 to establish a new message session, and a new message session is established if the management server 50 approves the request.

Figure 7:
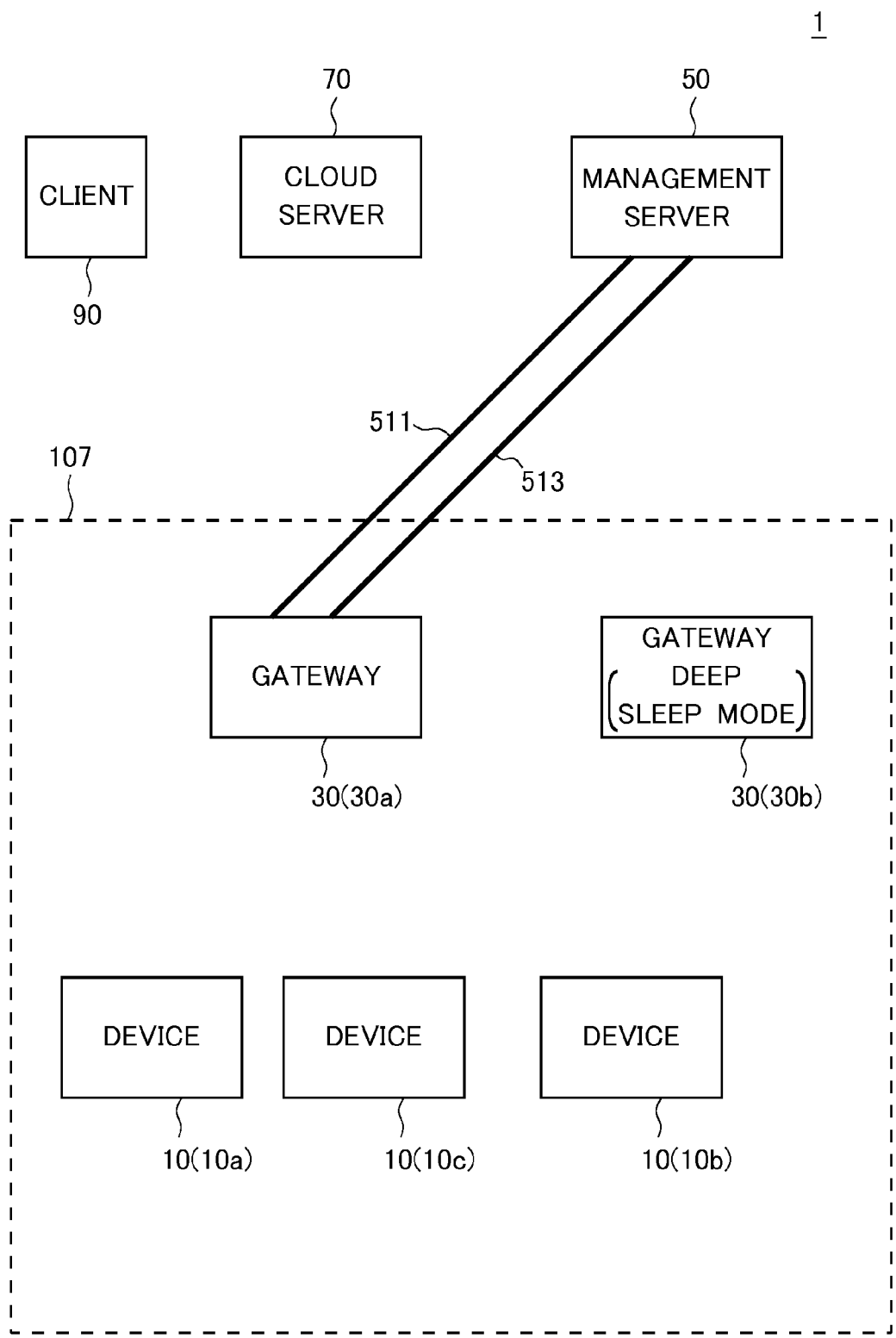
FIG. 7 is a conceptual diagram illustrating a state in which a new message session has been established.

FIG. 7 is a conceptual diagram illustrating a state in which the new message session 513 is established. As will be described later, this new message session 513 is used by the management server 50 to transmit a request signal destined for the gateway 30b (a substitute connection request and a tunnel connection request) to the gateway 30a.

In this way, the gateway 30a that has received the advance substitute request from the gateway 30b establishes the new message session 513 with the management server 50 as a substitute for use on the gateway 30b, and stands by for receipt of, for example, a tunnel connection request destined for the gateway 30b, which will be described later.

The gateway 30a also transfers substitute information based on the advance substitute request to the management server 50, and the management server 50 stores the substitute information in its storage unit. The substitute information includes information regarding a substitute relationship between the gateways 30a and 30b, including information indicating that the gateway 30a will receive a tunnel connection request destined for the gateway 30b in place of the gateway 30b. Note that the substitute information may be stored in the management table 69 (69a).

1-6. Return from Deep Sleep Mode

Figure 8:
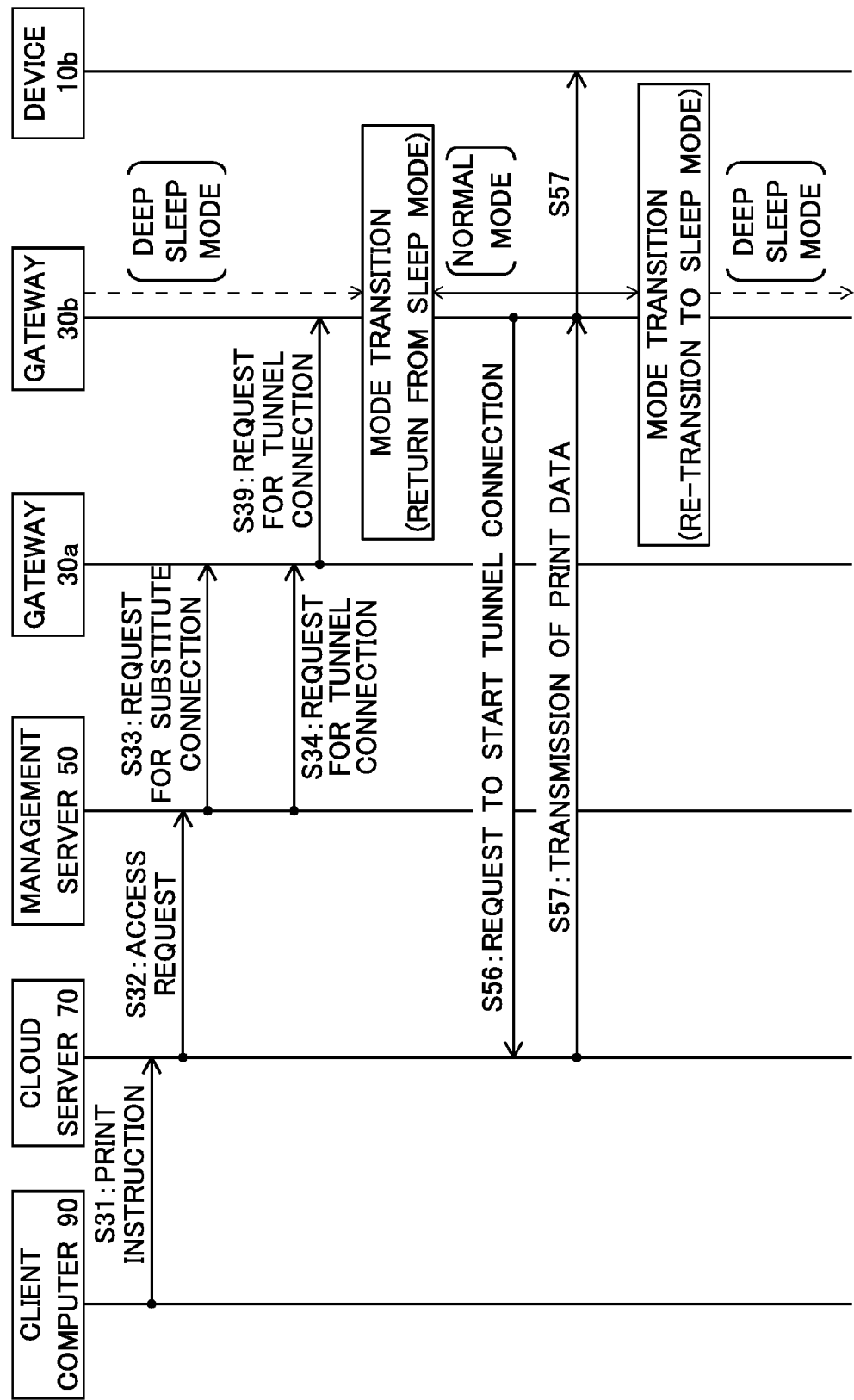
FIG. 8 is a timing chart illustrating operations performed by the communication system when the gateway returns to the deep sleep mode.
Figure 9:
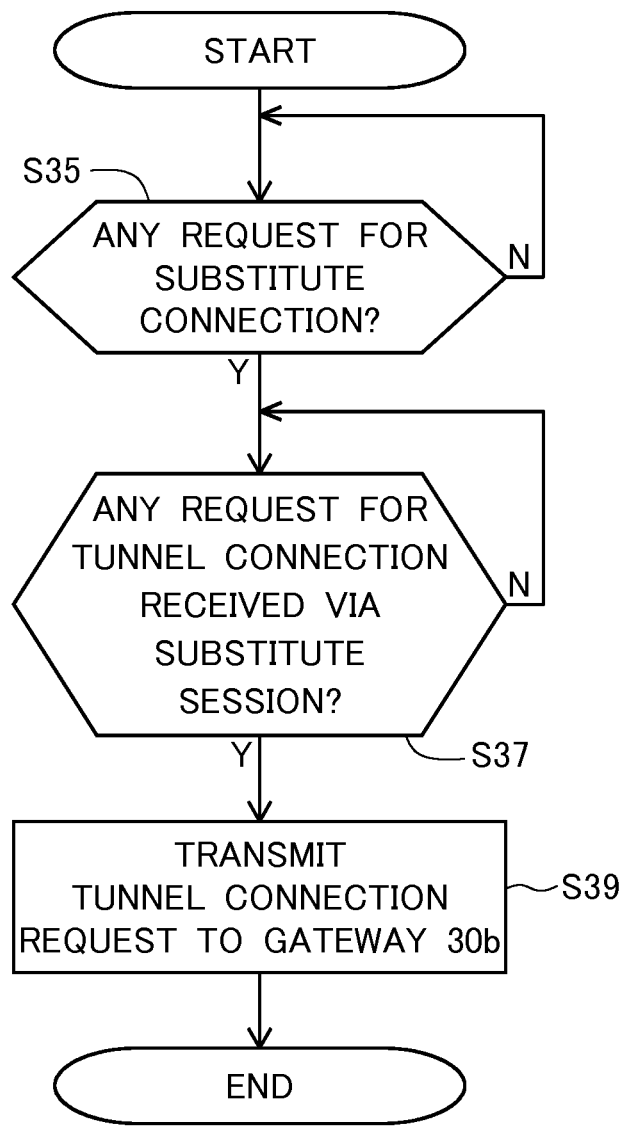
FIG. 9 is a flowchart of some of the operations in FIG. 8.

Next is a description of operations performed by the communication system 1 when the gateway 30b returns from the deep sleep mode (sleep state) to the normal mode (non-sleep state) in response to a request to access the device 10b from the cloud server 70, with reference to FIGS. 8 to 10. FIG. 8 is a timing chart of the operations, and FIG. 9 is a flowchart of some of the operations (operations of the gateway 30a). FIG. 10 is a conceptual diagram illustrating operations performed by the communication system 1 when the gateway 30b returns from the deep sleep mode.

A user operates a web browser or the like of the client 90 to access a cloud application in the cloud server 70. Then, a cloud print instruction based on the user operation using the client 90 is issued to the cloud server 70 through the cloud application (step S31 in FIG. 8). In other words, the cloud print instruction (also referred to as a job instruction) is transmitted from the client 90 to the cloud server 70. One example of the cloud print instruction is a print instruction to print a specific electronic document (print target data) stored in the cloud server 70, using a specific MFP (here, the device 10b).

The cloud server 70 (communication control unit 81) transmits an access request based on this cloud print instruction to the management server 50 that is registered in advance as a server corresponding to the cloud application (step S32). This access request includes information regarding the cloud server 70 as a source of access (e.g., information for identifying the IP address of the server) and information regarding a device to be accessed (here, the device 10b) (e.g., information for identifying the ID of the device).

The management server 50 (analyzer 67) analyzes content of the access request received from the cloud server 70 and performs processing based on a result of the analysis.

If the management server 50 has a message session with a gateway 30 (e.g., gateway 30a) that is supposed to relay tunnel communication based on the access request (i.e., when the gateway 30 that is supposed to relay tunnel communication based on the access request is in the normal mode), the same operations as described above are performed. For example, the management server 50 transmits a tunnel connection request to the gateway 30a corresponding to the device 10a, using the message session 511 with the gateway 30a. In response to the tunnel connection request, the gateway 30a establishes an HTTP session (tunnel communication) with the cloud server 70. Then, this tunnel connection is used to achieve communication from the cloud server 70 to the device 10 (e.g., gateway 10a) that is under the control of the gateway 30a, via the gateway 30a.

On the other hand, if the management server 50 has no message session with a gateway 30 (e.g., gateway 30b) that is supposed to relay tunnel communication based on the access request (i.e., when the gateway 30 that is supposed to relay tunnel communication based on the access request is in the sleep mode), the management server 50 transmits a "substitute connection request" to a "substitute gateway" (step S33). The "substitute gateway" performs some operations of a specific gateway in place of the specific gateway. The "substitute gateway" can also be expressed as a gateway that receives a tunnel connection request destined for a specific gateway in place of the specific gateway (substitute reception). The management server 50 determines a substitute gateway for the gateway 30b on the basis of the aforementioned substitute information. Assume here that the gateway 30a is determined as a gateway (substitute gateway) that receives a tunnel connection request destined for the gateway 30b in place of the gateway 30b (substitute reception). In this case, the management server 50 transmits a "substitute connection request" to the gateway 30a in step S33. The "substitute connection request" is an instruction to request the substitute gateway to receive a tunnel connection request in place of the original gateway 30b (substitute reception).

The management server 50 also transmits a tunnel connection request to the gateway 30a (step S34). The substitute connection request and the tunnel connection request are transmitted from the management server 50 to the gateway 30a, using the new message session 513 that is established as a substitute for use on the gateway 30a in advance between the management server 50 and the gateway 30a. Although the substitute connection request and the tunnel connection request are transmitted as separate connection requests in this example, the present invention is not limited to this example. For example, both the substitute connection request and the tunnel connection request may be collectively transmitted as a single connection request. In addition, it is not an absolute necessity to transmit a substitute connection request.

As illustrated in FIG. 9, the gateway 30a receives the substitute connection request and the tunnel connection request via the message session 513 (FIG. 7), which is established as a substitute for the gateway 30b in advance with the management server 50 (steps S35 and S37), and the procedure proceeds to step S39. In step S39, the gateway 30a transmits a tunnel connection request to the gateway 30b.

Upon receiving the tunnel connection request from the gateway 30a, the gateway 30b returns from the deep sleep mode to the normal mode (see FIG. 8). The gateway 30b also establishes an HTTP (HTTPS) session (tunnel communication) with the cloud server 70 in response to the tunnel connection request (step S56). Specifically, the gateway 30b requests the cloud server 70c to establish tunnel communication, and tunnel communication is established if the cloud server 70 approves the request. Note that FIG. 10 schematically indicates such "tunnel communication" by a long and slender rectangle shaded with dots.

Then, this tunnel communication is used to achieve communication from the cloud server 70 to the device 10b that is under the control of the gateway 30b, via the gateway 30b (step S57). This allows the cloud server 70 to transmit a specific electronic document (e.g., print target data) to the device 10 via the gateway 30b that has returned from the sleep state.

Note that the gateway 30b will again transition to the deep sleep mode after a lapse of a predetermined non-operating period.

In the above-described operations, if the gateway 30b is in the deep sleep mode and the management server 50 has received from the cloud server 70 a request to access the device 10b that is under the control of the gateway 30b, the management server 50 transmits a tunnel connection request to the substitute gateway 30a in place of the gateway 30b. The substitute gateway 30a that has received the tunnel connection request from the management server 50 transfers the tunnel connection request to the gateway 30b and causes the gateway 30b to return from the deep sleep mode. The gateway 30b that has returned from the deep sleep mode to the normal mode establishes tunnel communication with the cloud server 70 on the basis of the tunnel connection request received from the substitute gateway 30a, and relays communication between the cloud server 70 and the device 10b.

This allows, for example, the management server 50 and the substitute gateway 30a to cause the gateway 30b in the deep sleep mode to return from the deep sleep mode. Accordingly, appropriate tunnel connection (tunnel communication) can be established between the cloud server 70 and the gateway 30b that is in the deep sleep mode.

In addition, the gateway 30b can request another substitute gateway 30a to substitute as the gateway 30b before transitioning to the deep sleep mode. This further reduces power consumption of the gateway 30b, and accordingly, power consumption of the entire system 1.

2. Second Embodiment

A second embodiment is a variation of the first embodiment. The following description focuses on differences from the first embodiment.

In the above-described first embodiment, the gateway 30b that has received a tunnel connection request from the substitute gateway 30a in the deep sleep mode returns from the deep sleep mode and immediately establishes tunnel communication with the cloud server 70 in response to the tunnel connection request. Note that such a connection mode of tunnel communication is simpler than another connection mode (normal connection mode), which will be described later, and is thus also referred to as a "simple connection mode."

The present invention is, however, not limited to this example. For example, the gateway 30b that has received a tunnel connection request from the substitute gateway 30a and returned from the deep sleep mode may again establish a message session 521 with the management server 50 (see FIG. 14). Then, the gateway 30b may anew receive a tunnel connection request from the management server 50 via this message session 521 and establish tunnel connection (tunnel communication) on the basis of the received tunnel connection request. In the case of re-generating (re-establishing) the message session 521, it is preferable for the gateway 30b to search for devices 10 that are under the control of the gateway 30b, acquire up-to-date information including a result of the search, and notify the management server 50 of the acquired information. The above-described establishment mode (connection mode) of tunnel communication is also referred to as a "normal connection mode."

The second embodiment describes an example of a case in which tunnel communication between the cloud server 70 and the gateway 30b that has returned from the deep sleep mode is achieved in a predetermined mode that is specified from the aforementioned two connection modes, the normal connection mode and the simple connection mode, depending on the user settings.

Figure 12:
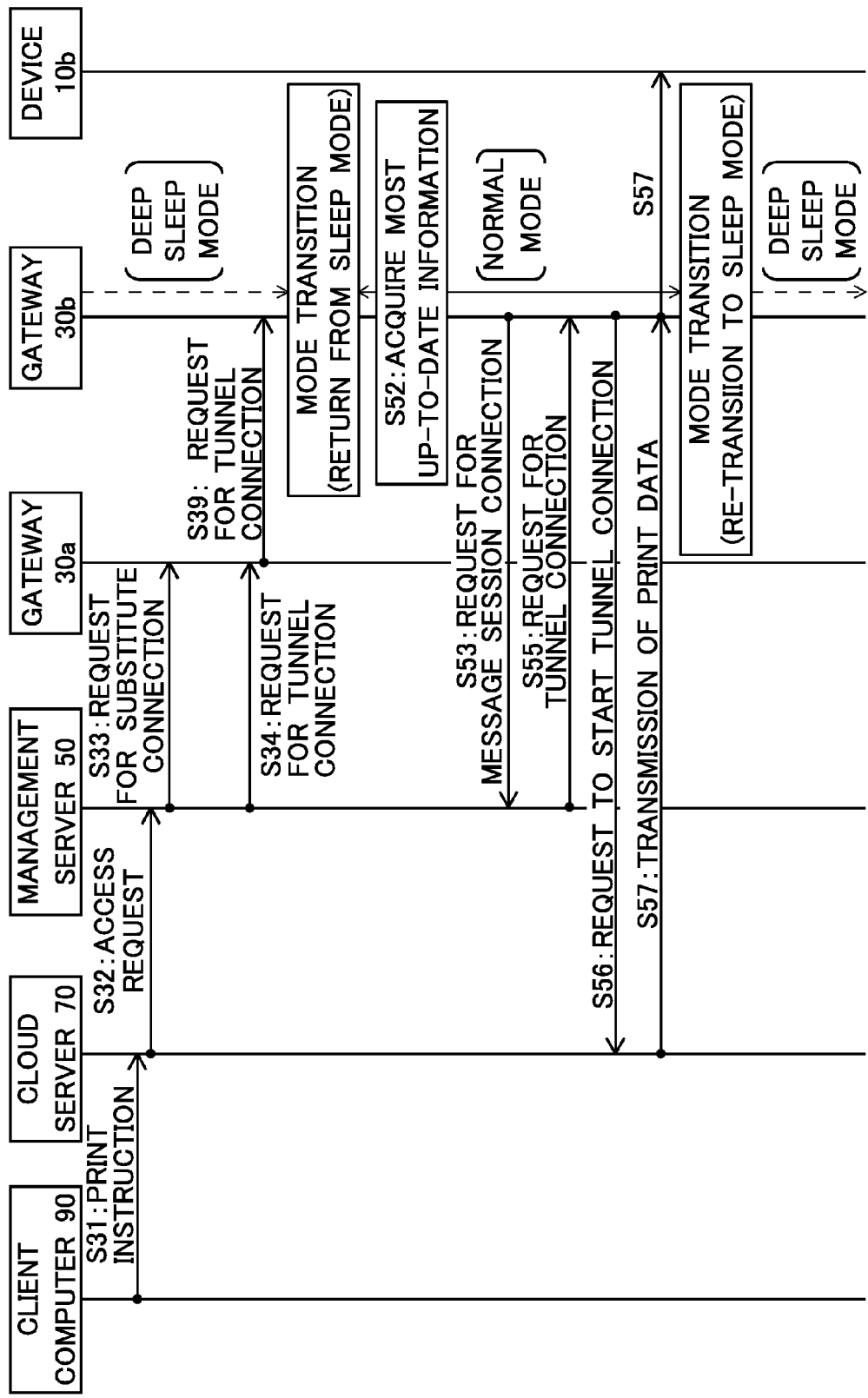
FIG. 12 is a timing chart of operations performed by a communication system according to a second embodiment.
Figure 13:
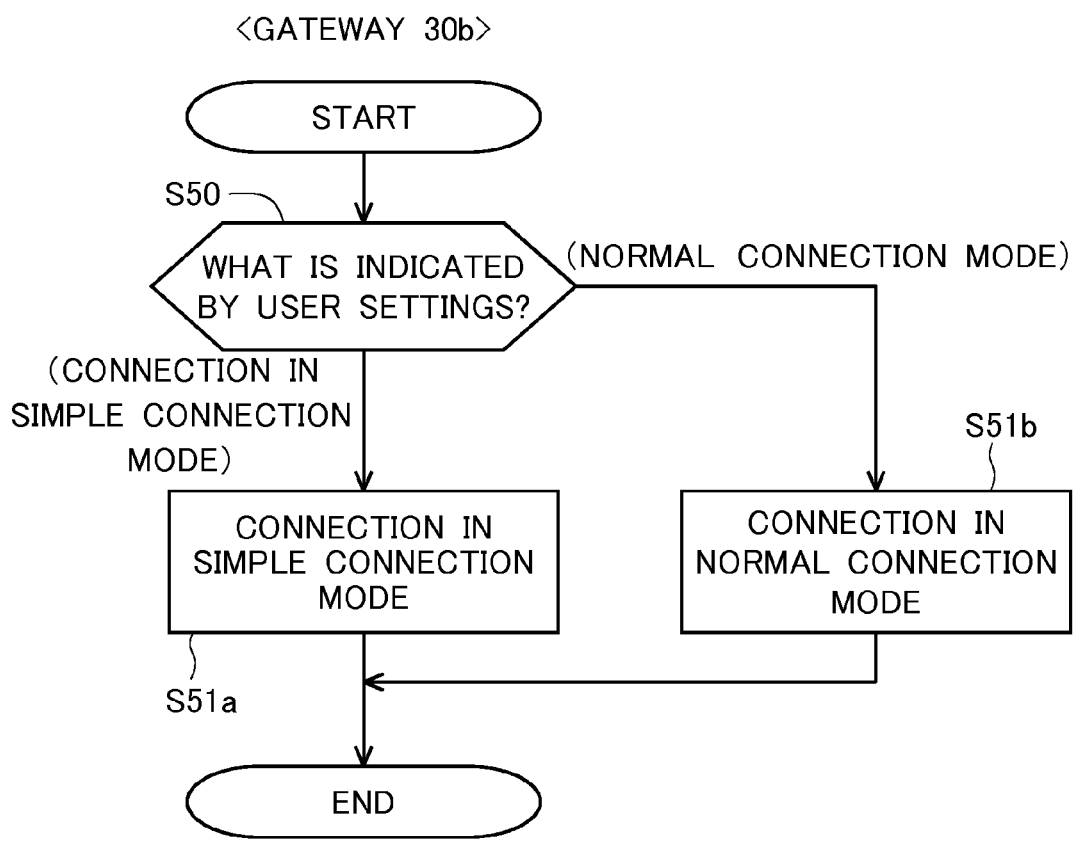
FIG. 13 is a flowchart of some of the operations in FIG. 12.
Figure 14:
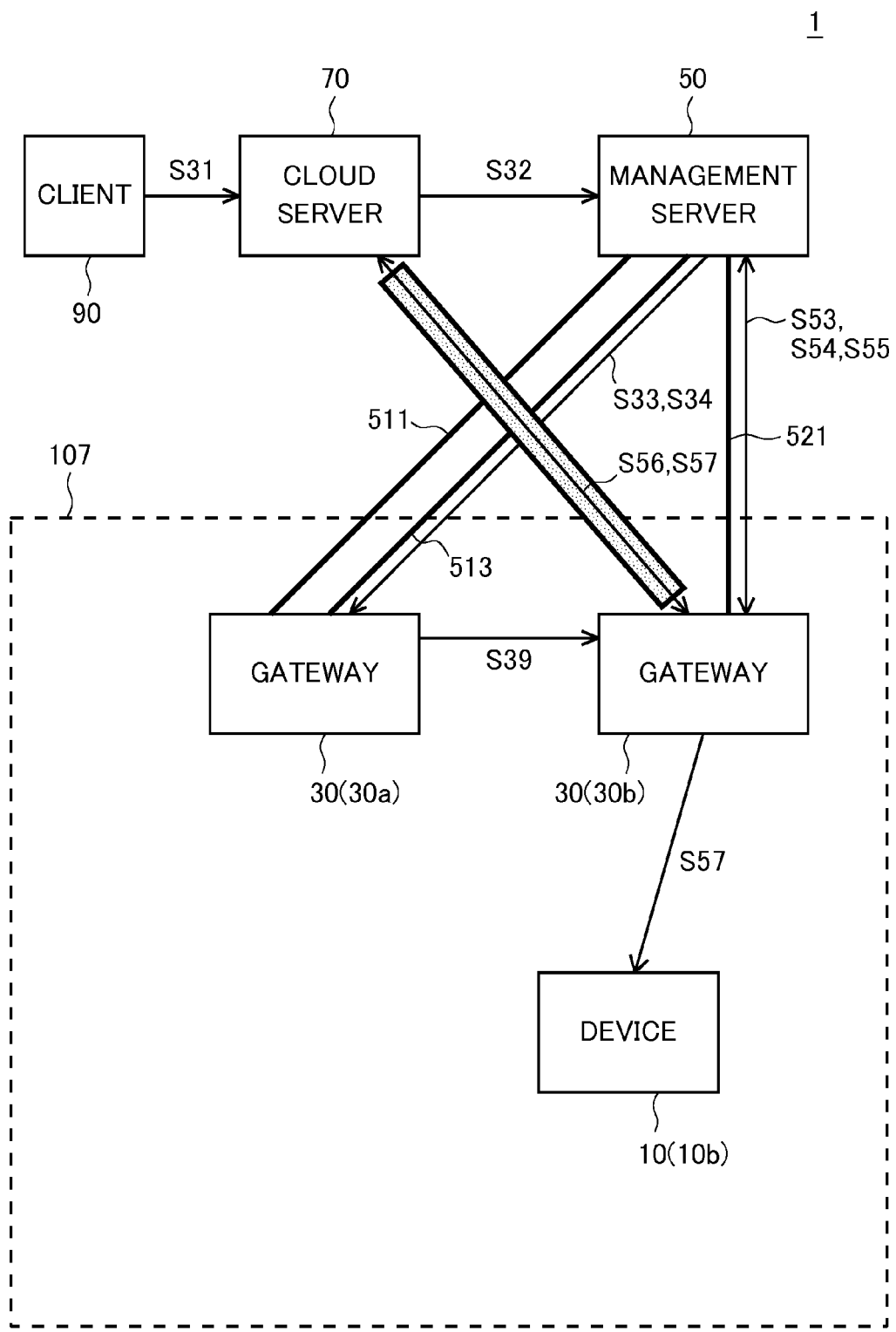
FIG. 14 is a conceptual diagram illustrating the operations in FIG. 12

FIG. 12 is a timing chart of operations (e.g., an operation of the gateway 30b when returning from the sleep mode) performed by a communication system according to the second embodiment. FIG. 13 is a flowchart of some of the operations (operations of the gateway 30b) performed by the communication system. FIG. 14 is a conceptual diagram illustrating operations (more specifically, operations performed by the communication system 1 when the gateway 30b returns from the deep sleep mode) according to the second embodiment.

Operations performed by the communication system 1 when the gateway 30b returns from the deep sleep mode (sleep state) to the normal mode (non-sleep state) will now be described with reference to FIGS. 12 to 14.

Steps S31 to S35, S37, and S39 are the same as those in the first embodiment (see FIGS. 12 and 14, for example).

The gateway 30b that has received a tunnel connection request from the gateway 30a returns from the deep sleep mode to the normal mode and performs operations illustrated in FIG. 13.

Specifically, in step S50, the gateway 30b determines the establishment mode (connection mode) of tunnel communication that is specified depending on the user settings (user settings in the gateway 30b), i.e., either the simple connection mode or the normal connection mode, and the procedure branches according to a result of the determination.

If the specified connection mode of tunnel communication is the simple connection mode, the procedure proceeds to step S51a. In step S51a, a connection operation is performed in the simple connection mode. The connection operation performed in the simple connection mode is the same as that in the first embodiment, and the processing of steps S56 and S57 is immediately performed.

On the other hand, if the specified connection mode of tunnel communication is the normal connection mode, the procedure proceeds to step S51b.

In step S51b, a connection operation is performed in the normal connection mode.

Specifically, the gateway 30b (information collecting unit 45) first searches for a device that is currently under the control of the gateway 30b, and acquires the most up-to-date information (device information) based on a result of the search (step S52). Accordingly, the gateway 30b can acquire the most up-to-date information, such as information indicating that the device 10b is thus currently not in normal operation due to having been turned off during the sleep mode of the gateway 30b.

Next, on condition that it is determined on the basis of the device information collected by the information collecting unit 45 that the device 10b is in normal operation, the gateway 30b (message session communication control unit 42) generates (establishes) a new message session 521 (see FIG. 14, for example) between the management server 50 and the gateway 30b corresponding to the device 10b (step S53). The gateway 30b then notifies the management server 50 of the most up-to-date information regarding devices that are under the control of the gateway 30b, via the new message session 521 (step S54). The gateway 30b also again receives a tunnel connection request (new tunnel connection request) from the management server 50 via the new message session 521 (step S55). In response to the tunnel connection request, the gateway 30b establishes tunnel connection (tunnel communication) with the cloud server 70 (step S56, i.e., S56b).

Using this tunnel connection achieves communication from the cloud server 70 to the device 10b that is under the control of the gateway 30b, via the gateway 30b (step S57). The gateway 30b (tunnel communication control unit 43) uses this tunnel connection to relay communication between the cloud server 70 and the device 10b. This allows the cloud server 70 to transmit a specific electronic document (e.g., print target data) to the device 10 via the gateway 30b that has returned from the sleep state.

Note that if it is determined in the normal connection mode that the device 10b is not in normal operation, the management server 50 (or the gateway 30b) transmits error information to the cloud server 70.

The above-described operations can achieve the same effects as those in the first embodiment.

In particular, connection in the normal connection mode allows the management server 50 to perform appropriate error processing because the management server 50 can acquire information such as that the device 10b is currently not in normal operation due to having been turned off during the sleep mode of the gateway 30b (i.e., the device 10b is currently not under the control of the gateway 30b).

On the other hand, connection in the simple connection mode can simplify processing (and accordingly increase processing speed) because the gateway 30b has no need to perform processing such as searching for devices that are under the control of the gateway 30b or re-establishing a message session with the management server 50.

In addition, a user can have a high degree of freedom through appropriate selection of either the simple connection mode or the normal connection mode depending on user settings.

Although the second embodiment describes an example of the case in which tunnel communication is re-established in a predetermined mode that is specified from the two connection modes, the normal connection mode and the simple connection mode, depending on user settings, the present invention is not limited to this example. For example, tunnel communication may always be re-established in the normal connection mode.

3. Third Embodiment

A third embodiment is a variation of the first embodiment. The following description focuses on differences from the first embodiment.

Figure 17:
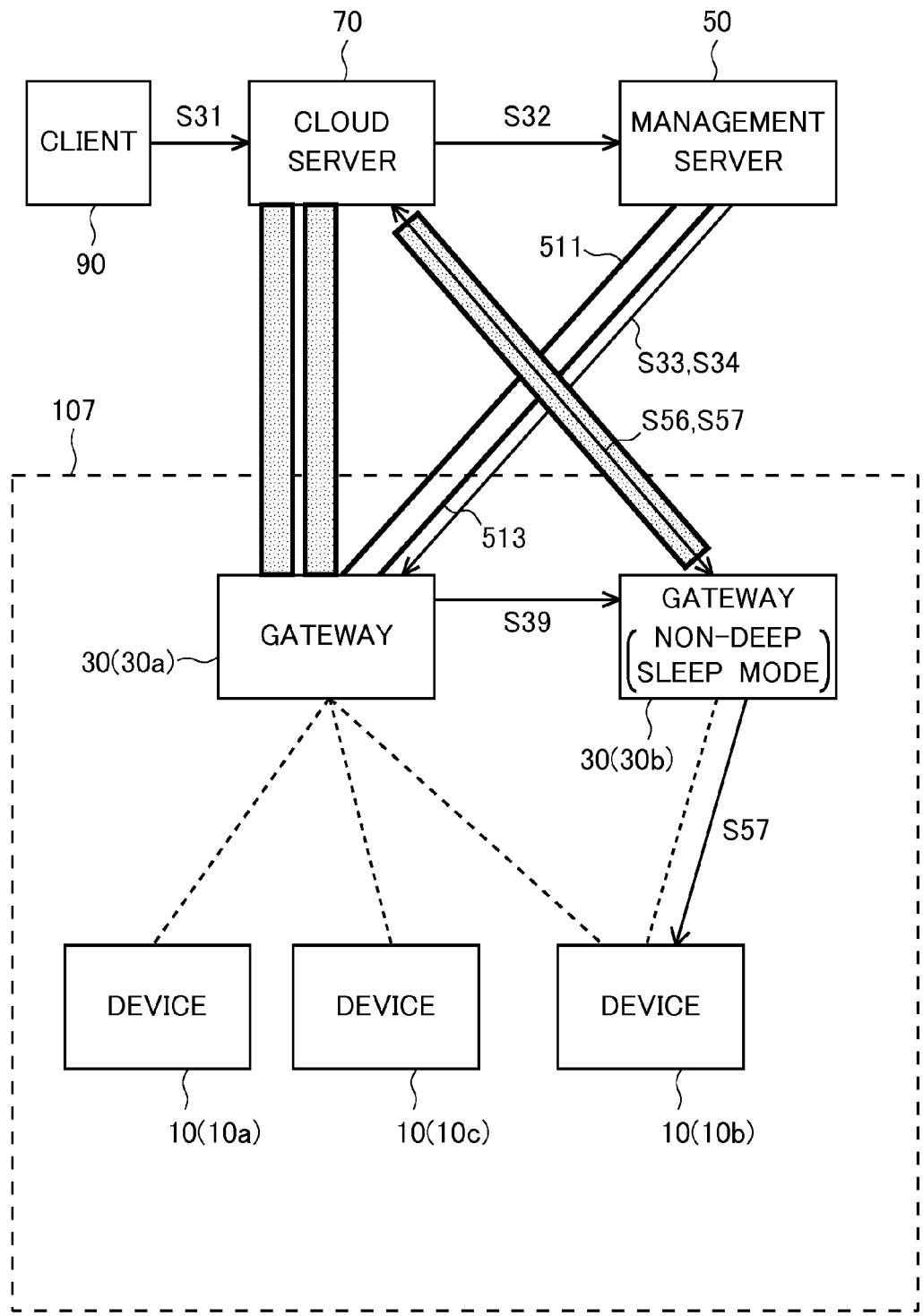
FIG. 17 is a conceptual diagram illustrating operations performed by the communication system when the number of tunnel connections to a gateway has already reached a predetermined upper-limit value (maximum value).
Figure 18:
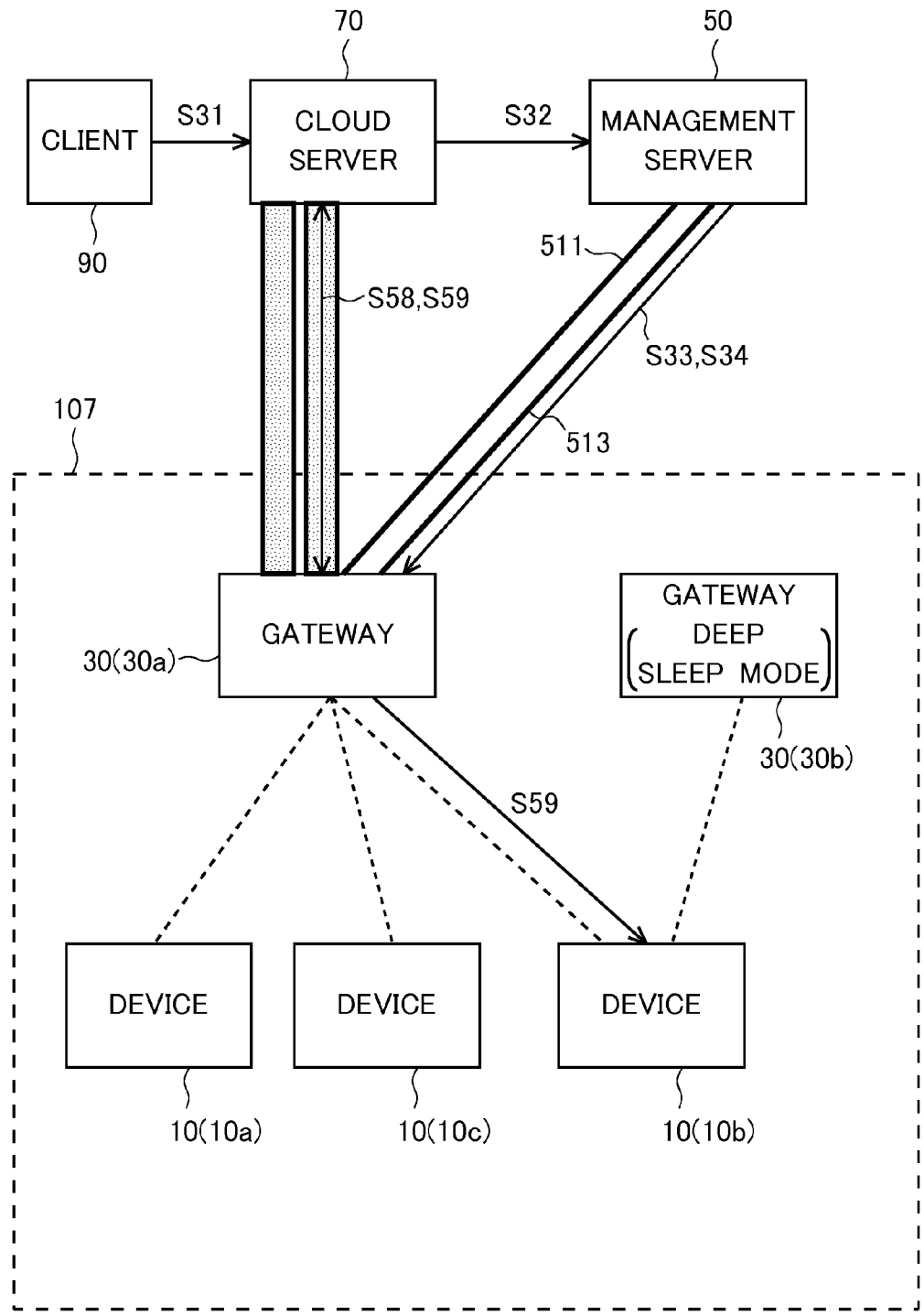
FIG. 18 is a conceptual diagram illustrating operations performed by the communication system when the number of tunnel connections to the gateway has not yet reached the predetermined upper-limit value (maximum value).

The third embodiment assumes a situation in which both of the gateways 30a and 30b have control over a common device 10 (here, device 10b) (see FIGS. 17 and 18).

In the third embodiment, the management server 50 that has received a request to access the device 10b from the cloud server 70 selects a gateway 30 corresponding to the device 10b out of the two gateways 30a and 30b on the basis of the management information 310. Assume here that the gateway 30b is selected as a gateway corresponding to the device 10b.

The management server 50 then determines that there is no message session between the gateway 30b and the management server 50, and transmits a tunnel connection request destined for the gateway 30b to the substitute gateway 30a via the message session 513 between the management server 50 and the substitute gateway 30a. Accordingly, the gateway 30a receives the tunnel connection request destined for the gateway 30b.

Next, the substitute gateway 30a determines whether to transfer the tunnel connection request to the gateway 30b, depending on whether a predetermined condition is satisfied. The substitute gateway 30a recognizes that the device 10b is also under its control (under the control of the substitute gateway 30a), and determines whether to process the tunnel connection request by itself.

Here, the predetermined condition is assumed to be a result of determination as to whether the number of tunnel connections to the gateway 30a has already reached a predetermined upper-limit value (e.g., two).

Then, a gateway 30 (30a or 30b) that has finally received the tunnel connection request establishes tunnel connection with the cloud server 70, and the established tunnel connection is used to, for example, transmit print target data from the cloud server 70 to the device 10b serving as a transmission destination.

Figure 15:
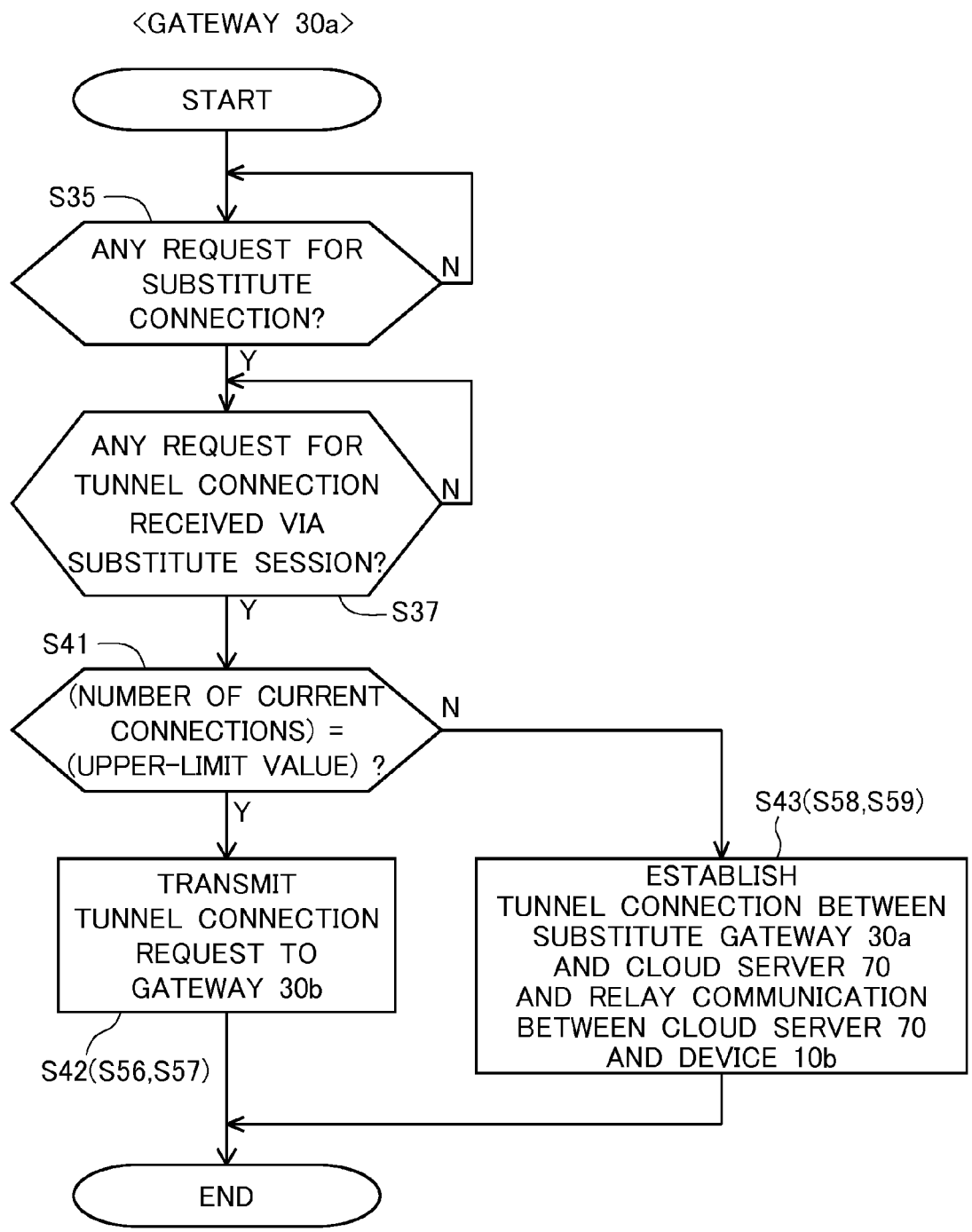
FIG. 15 is a flowchart of some operations according to a third embodiment.
Figure 16:
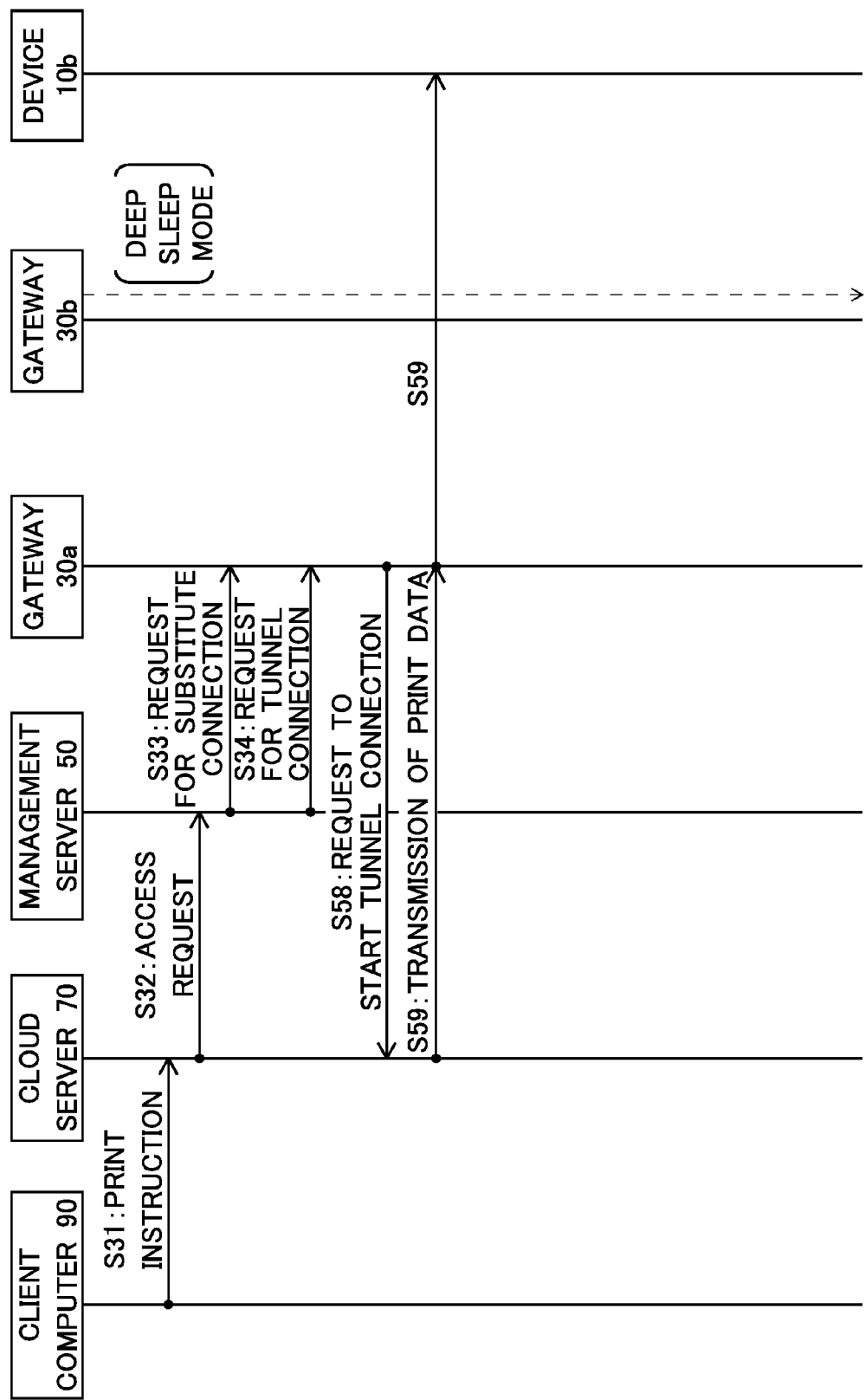
FIG. 16 is a timing chart of exemplary operations according to the third embodiment.

FIG. 15 is a flowchart of some of the operations (operations of the operation (gateway 30a) performed by a communication system according to the third embodiment. FIG. 16 is a timing chart of the operations performed by the communication system according to the third embodiment (operations performed when the number of tunnel connections to the gateway 30a has not yet reached a upper-limit value or maximum value). FIGS. 17 and 18 are conceptual diagrams illustrating operations according to the third embodiment (more specifically, operations performed by the communication system 1 when the cloud server 70 has issued a request to access the device 10b). FIG. 17 illustrates operations performed when the number of tunnel connections to the gateway 30a has already reached the predetermined upper-limit value (maximum value), and FIG. 18 illustrates operations performed when the number of tunnel connections to the gateway 30a has not yet reached the predetermined upper-limit value (maximum value).

When the cloud server 70 has issued a request to access the device 10b, the processing of steps S31, S32, S33, and S34 are performed as in the first embodiment (see FIG. 16). Specifically, the management server 50 that has received the request to access the device 10b from the cloud server 70 transmits a substitute connection request and a tunnel connection request to the gateway 30a. In other words, the management server 50 transmits a tunnel connection request destined for the gateway 30b to the gateway 30a.

Then, the gateway 30a performs operations illustrated in FIG. 15.

The gateway 30a that has received the substitute connection request and the tunnel connection request goes through steps S35 and S37 to step S41.

In step S41, the gateway 30a determines whether the number of tunnel connections to the gateway 30a has already reached a predetermined upper-limit value (e.g., two), and the procedure branches according to a result of the determination.

If the number of current tunnel connections between the cloud server 70 and the gateway (substitute gateway) 30a has already reached a predetermined upper-limit value (e.g., two), the procedure proceeds to step S42, in which the same processing as that in the first embodiment (see FIG. 8), or in the second embodiment (see FIG. 12), is performed. Assume here that the same processing as that in the first embodiment is performed, for ease of description.

Specifically, as illustrated in FIG. 17 (see also FIG. 8 and other drawings), the gateway 30a transfers the tunnel connection request received from the management server 50 to the gateway 30b and causes the gateway 30b to return from the deep sleep mode (step S39). The gateway 30b establishes tunnel communication with the cloud server 70 in the simple connection mode (step S56), and uses this tunnel communication to achieve communication from the cloud server 70 to the device 10 (e.g., device 10b) that is under the control of the gateway 30b, via the gateway 30b (step S57).

On the other hand, if the number of current tunnel connections between the cloud server 70 and the substitute gateway 30a has not yet reached the predetermined upper-limit value, the processing of step S43 (FIG. 15) is performed. In step S43, processing of steps S58 and S59 is performed, which will be described below.

Specifically, as illustrated in FIGS. 16 and 18, the substitute gateway 30a establishes new tunnel connection (tunnel communication) with the cloud server 70 (step S58) and relays communication between the cloud server 70 and the device 10b (step S59). In step S59, this new tunnel communication is used to achieve communication from the cloud server 70 to the device 10 (e.g., device 10b) that is under the control of the gateway 30a, via the gateway 30a.

As described above, the gateway 30a that has received a substitute connection request and a tunnel connection request from the management server 50 does not unconditionally transfer the tunnel connection request to the gateway 30b. The gateway 30a determines whether to transfer the tunnel connection request to the gateway 30b, depending on the situation.

The gateway 30a that still has sufficient resources (e.g., when the number of tunnel connections between the gateway 30a and the cloud server 70 is less than the upper-limit value) performs operations as illustrated in FIG. 18. Specifically, the gateway 30a itself establishes tunnel connection with the cloud server 70 on the basis of the tunnel connection request received from the management server 50, instead of transferring the tunnel connection request to the gateway 30b, and relays communication between the cloud server 70 and the device 10b. In short, the substitute gateway 30a itself communicates with the cloud server 70 via the tunnel connection, in place of the gateway 30b.

This allows efficient use of resources of the gateway 30a and makes the gateway 30b remain in the deep sleep mode as long as possible, thus reducing power consumption associated with return of the gateway 30b from the deep sleep mode.

4. Fourth Embodiment

A fourth embodiment is a variation of the third embodiment. The following description focuses on differences from the third embodiment.

The fourth embodiment also assumes a situation in which both of the gateways 30a and 30b have control over a common device 10 (in the present example, device 10b).

In the fourth embodiment as well, the management server 50 that has received a request to access the device 10b from the cloud server 70 selects a gateway 30 corresponding to the device 10b out of the two gateways 30a and 30b on the basis of the management information 310. Assume here that the gateway 30b is selected as a gateway corresponding to the device 10b.

The management server 50 then determines that there is no message session between the gateway 30b and the management server 50, and transmits a tunnel connection request destined for the gateway 30b to the substitute gateway 30a via the message session 513 between the management server 50 and the substitute gateway 30a. In response, the gateway 30a receives the tunnel connection request destined for the gateway 30b.

Next, the gateway 30a determines whether to transfer the tunnel connection request to the gateway 30b, according to whether a predetermined condition is satisfied. Then, a gateway 30 (30a or 30b) that has finally received the tunnel connection request establishes tunnel connection with the cloud server 70, and the established tunnel connection is used to, for example, transmit print target data from the cloud server 70 to the target device 10b, which is a transmission destination.

In the fourth embodiment, the predetermined condition is assumed to be a result of determination as to the hierarchy of security levels of the substitute gateway 30a and the gateway 30b.

Figure 19:
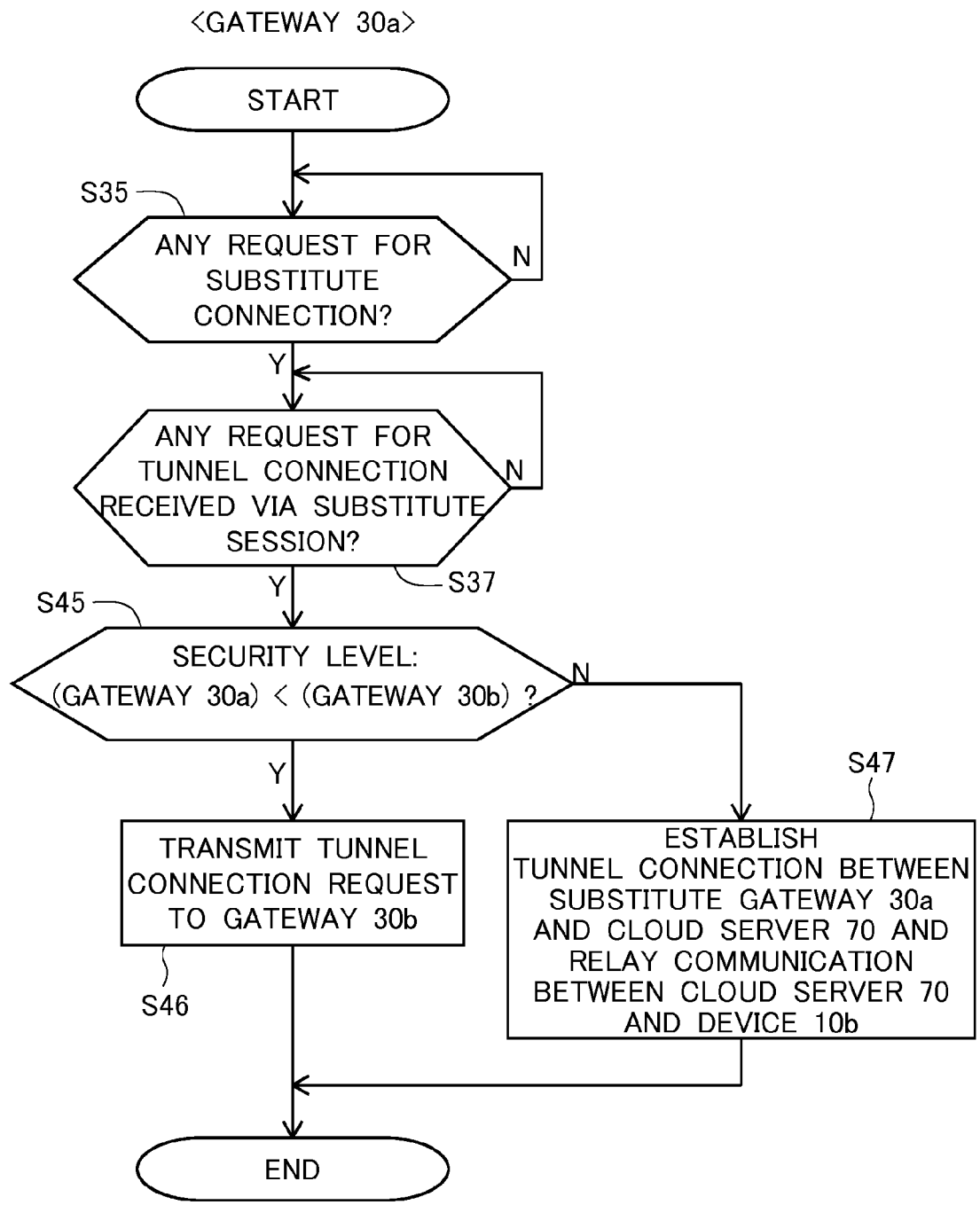
FIG. 19 is a flowchart of some operations according to a fourth embodiment.

FIG. 19 is a flowchart of some operations (operations of the gateway 30a) performed by a communication system according to the fourth embodiment.

When the cloud server 70 has issued a request to access the device 10b, the processing of steps S31, S32, S33, and S34 is performed as in the third embodiment, or as in the first embodiment (see FIG. 16). Specifically, the management server 50 that has received a request to access the device 10b from the cloud server 70 transmits a substitute connection request and a tunnel connection request to the gateway 30a.

The gateway 30a performs operations as illustrated in FIG. 19.

When the gateway 30a has received the substitute connection request and the tunnel connection request, the procedure proceeds through steps S35 and S37 to step S45.

In step S45, the hierarchy of the security levels of the substitute gateway 30a and the gateway 30b is determined, and the procedure branches according to a result of the determination.

Here, the security levels of the gateways 30a and 30b are appropriately set according to places where they are disposed, for example. For example, a gateway 30 that is disposed in a department that requires information to be concealed at a relatively high level (e.g., a gateway 30 that manages information that requires a relatively high level of concealment) is set to have a relatively high security level. On the other hand, a gateway 30 that is disposed in a department that requires information to be concealed at a relatively low level (e.g., a gateway 30 that rarely handles concealed information) is set to have a relatively low security level.

For example, if the gateway 30b has a security level "3" and the substitute gateway 30a has a security level "5", it is determined that the security level of the substitute gateway 30a is higher than that of the gateway 30b. Assume here that a higher value indicates a higher level of security ensured.

In step S45, it is preferable to compare security levels of items regarding the security of the paths of tunnel connection, for example. For instance, it is preferable to compare "encryption levels" of the paths of tunnel connection and/or "certificate verification levels" of the paths of tunnel connection. On the other hand, there is no need to take into consideration items regarding the security of entities other than the paths of tunnel connection (e.g., "encrypted PDF settings" regarding encryption of PDF files, or "HDD encryption" regarding encryption of the hard disk drives (HDDs) of the gateways 30).

It is also assumed that the gateway 30a acquires the security levels of the gateways 30a and 30b in advance prior to the operations in FIG. 19. For example, the gateway 30a may acquire these security levels through communication with the gateway 30b.

If it is determined in step S45 that the security level of the substitute gateway 30a is lower than that of the gateway 30b, the procedure proceeds to step S46 in which the same processing as that in the above-described first embodiment (see FIG. 8), or in the second embodiment (see FIG. 12), is performed. Assume here that the same processing as that in the first embodiment is performed, for ease of description.

Specifically the operations illustrated in FIG. 17 (see also FIG. 8) are performed. To be more specific, the gateway 30a transfers the tunnel connection request received from the management server 50 to the gateway 30b and causes the gateway 30b to return from the deep sleep mode (step S39). The gateway 30b establishes tunnel communication with the cloud server 70 in the simple connection mode (step S56) and uses this established tunnel communication to achieve communication from the cloud server 70 to the device 10 (e.g., device 10b) that is under the control of the gateway 30b, via the gateway 30b (step S57).

On the other hand, if the security level of the substitute gateway 30a is higher than or equal to that of the gateway 30b, the processing of step S47 (FIG. 19) is performed. In step S47, the processing of steps S58 and S59 is performed.

Specifically, the operations illustrated in FIGS. 16 and 18 are performed. To be more specific, the substitute gateway 30a establishes new tunnel connection (tunnel communication) with the cloud server 70 (step S58) and relays communication between the cloud server 70 and the device 10b (step S59). In step S59, this new tunnel communication is used to achieve communication from the cloud server 70 to the device 10 (e.g., device 10b) that is under the control of the gateway 30a, via the gateway 30a.

As described above, the gateway 30a that has received the substitute connection request and the tunnel connection request from the management server 50 does not unconditionally transfer the tunnel connection request to the gateway 30b.

The gateway 30a whose security level is not so much different from that of the gateway 30b (i.e., the security level of the substitute gateway 30a is higher than or equal to that of the gateway 30b) performs operations as illustrated in FIG. 18. Specifically, the gateway 30a itself establishes tunnel connection with the cloud server 70 on the basis of the tunnel connection request received from the management server 50, instead of transferring the tunnel connection request to the gateway 30b, and relays communication between the cloud server 70 and the device 10b. In short, the substitute gateway 30a itself communicates with the cloud server 70 via the tunnel connection in place of the gateway 30b.

This avoids degradation of the security level and enables the gateway 30b to remain in the deep sleep mode as long as possible, thus reducing power consumption associated with return of the gateway 30b from the deep sleep mode.

Although the third and fourth embodiments mainly describe an example of the case in which the gateway 30b establishes tunnel connection with the cloud server 70 in the simple connection mode, the present invention is not limited to this example. For example, the gateway 30b in the third and fourth embodiments may establish tunnel connection with the cloud server 70 in the normal connection mode (see FIG. 14). In particular, the tunnel connection between the gateway 30b and the cloud server 70 may be established in a mode that is specified from the simple connection mode and the normal connection mode by a user, as in the second embodiment.

5. Fifth Embodiment

5-1. Overview

A fifth embodiment is a variation of the first embodiment. The following description focuses on differences from the first embodiment.

The above-described first embodiment takes the example of the case in which the gateway 30b transmits an advance substitute request to the gateway 30a immediately before transitioning to the deep sleep mode (see FIGS. 5 and 6).

On the other hand, the fifth embodiment takes the example of the case in which the gateway 30b does not transmit an advance substitute request to the gateway 30a. In the fifth embodiment, the gateway 30a acquires management information regarding other gateways 30 (e.g., gateway 30b) inside the LAN 107 at a constant interval and transfers the management information whenever necessary to store the management information in the management server 50. The management server 50 determines a substitute gateway for the gateway 30b on the basis of the (most up-to-date) management information and transmits a tunnel connection request to the determined substitute gateway (e.g., gateway 30a).

5-2. Transition to Deep Sleep Mode

Figure 20:
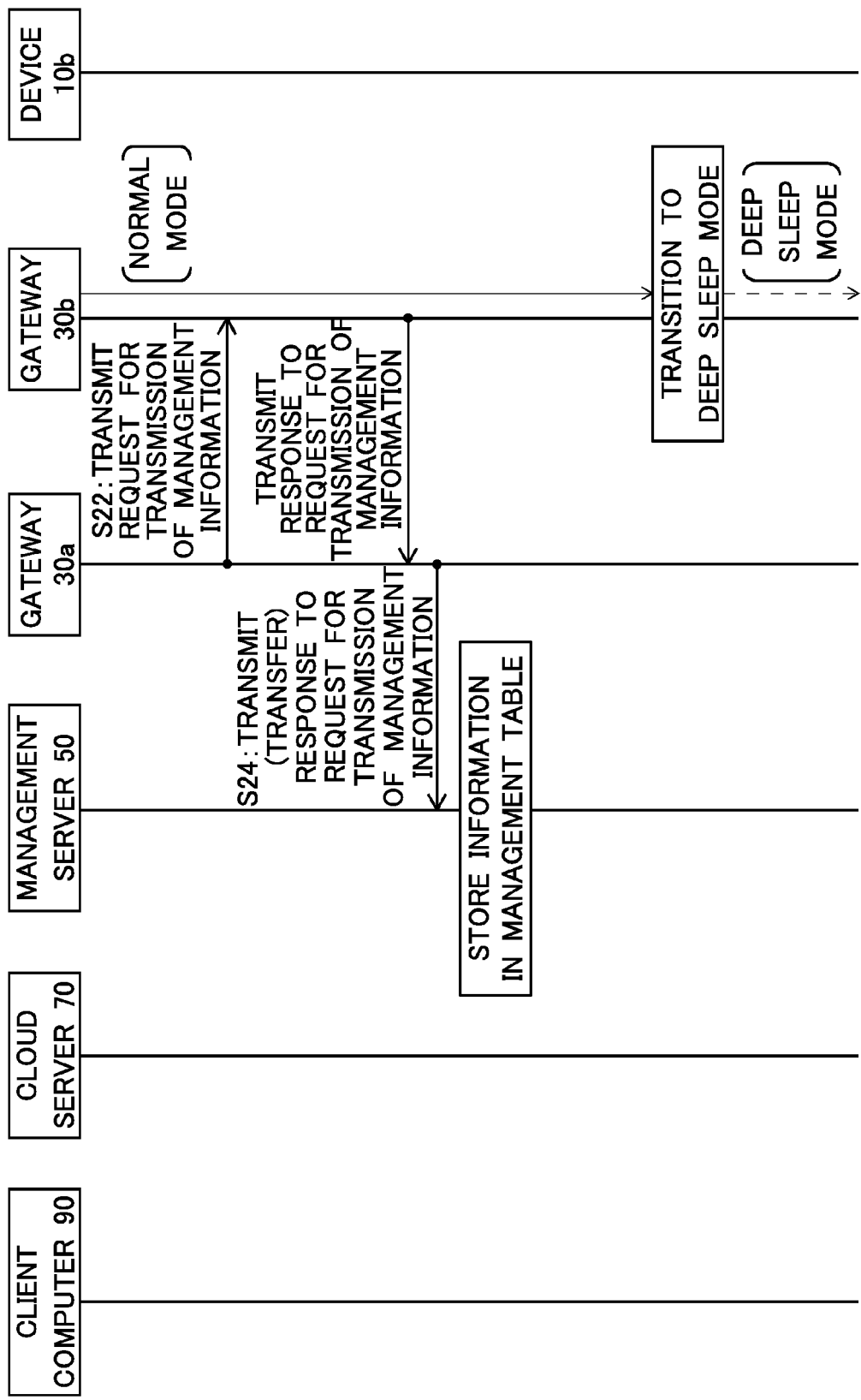
FIG. 20 is a timing chart of operations performed by the communication system when a gateway transitions to the deep sleep mode, according to a fifth embodiment.
Figure 21:
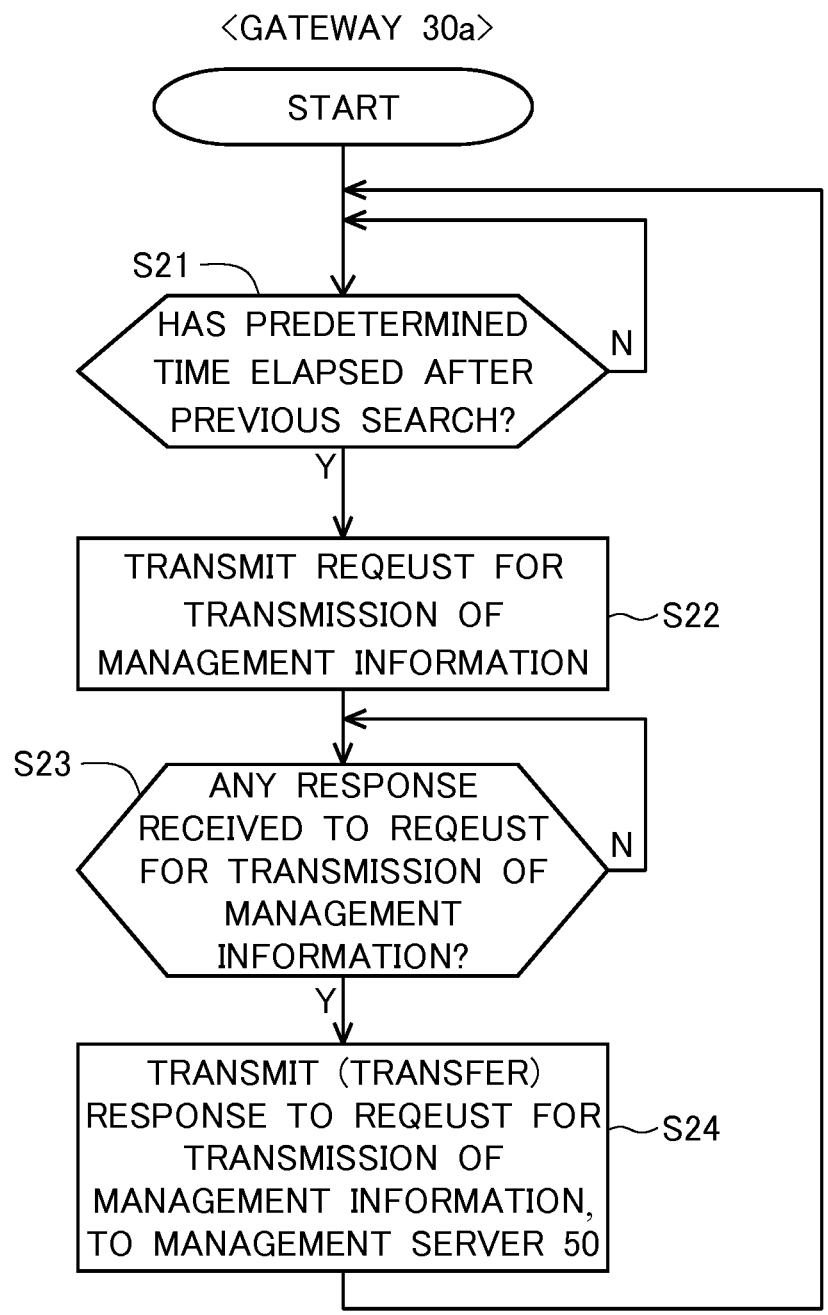
FIG. 21 is a flowchart of some of the operations in FIG. 20.
Figure 22:
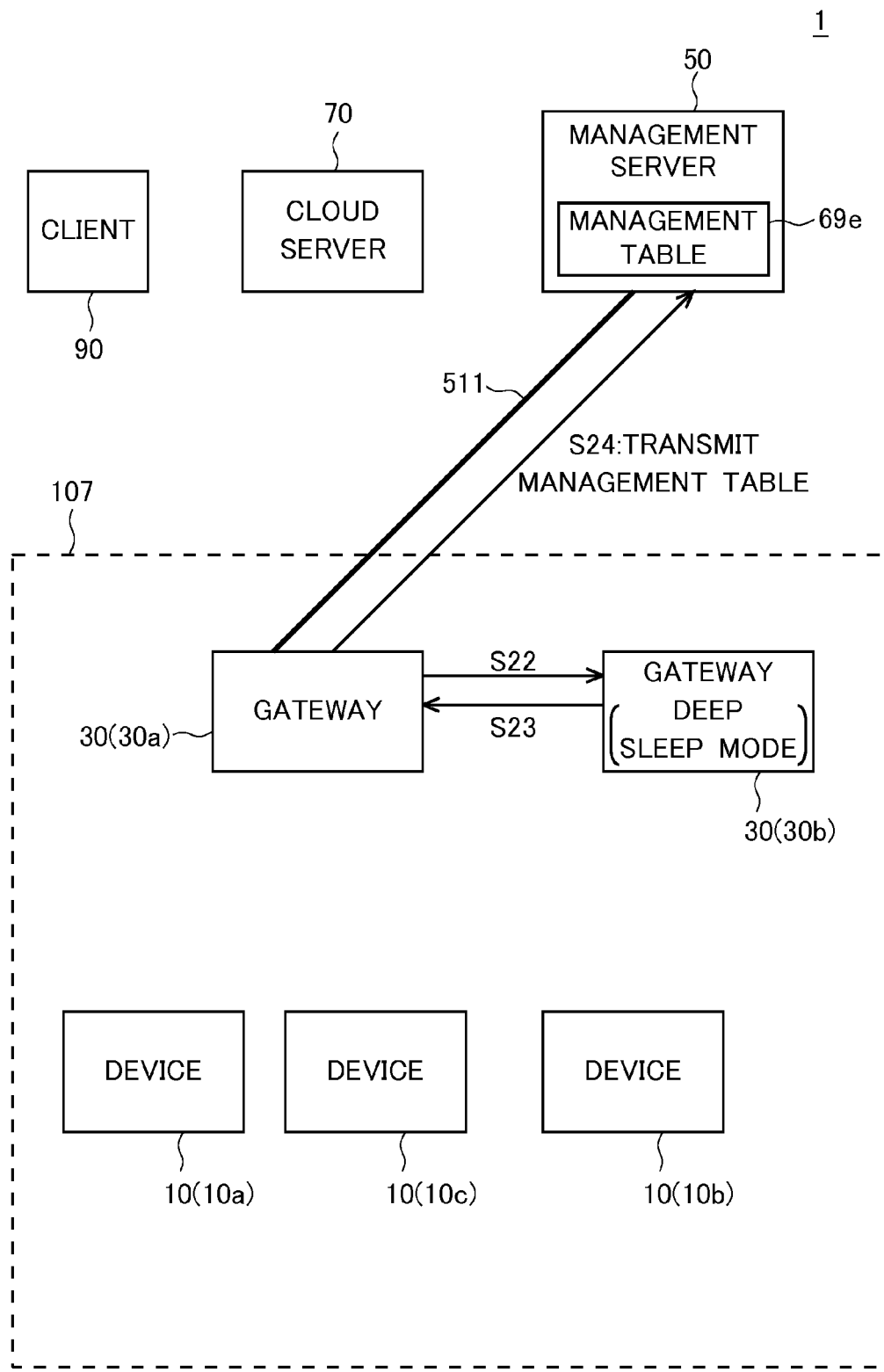
FIG. 22 is a conceptual diagram illustrating operations according to the fifth embodiment.
Figure 23:
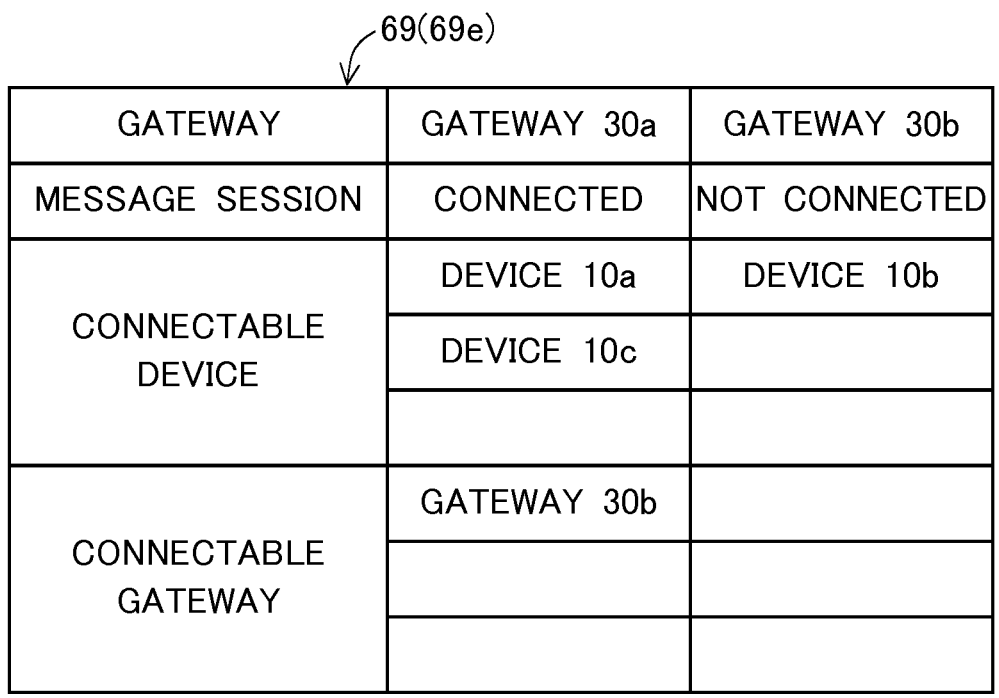
FIG. 23 illustrates a management table according to the fifth embodiment.

FIG. 20 is a timing chart illustrating operations performed by the communication system (mainly, operations performed before the gateway 30b transitions to the deep sleep mode) according to a fifth embodiment. FIG. 21 is a flowchart of some of the operations (operations of the gateway 30a) performed by the communication system according to the fifth embodiment. FIG. 22 is a conceptual diagram illustrating the operations (mainly, operations performed before the gateway 30b transitions to the deep sleep mode) according to the fifth embodiment. FIG. 23 illustrates an example of management information 350 stored in the management server 50.

In the fifth embodiment, the operations illustrated in FIG. 20 are performed instead of the operations of the first embodiment in FIG. 5. Specifically, the gateway 30a (also referred to as a "supervisory gateway") that centrally controls a plurality of gateways 30, or more specifically the information collecting unit 45 of the gateway 30a, acquires management information regarding the other gateways 30 (including the gateway 30b) and transmits the acquired management information to the management server 50, instead of the gateway 30b performing advance substitute request processing before transitioning to the deep sleep mode.

FIG. 21 is a flowchart of operations performed by the gateway 30a.

As illustrated in FIG. 21, if it is determined in step S21 that a predetermined period of time (e.g., one minute) has elapsed after the previous search, the procedure proceeds to step S22.

In step S22, the gateway 30a (information collecting unit 45) transmits a search instruction (search packet) to confirm the presence or absence of other gateways 30 (e.g., gateway 30b) inside the LAN 107. The gateway 30a (information collecting unit 45) also transmits a management information transmission request to other gateways 30 (e.g., gateway 30b) that have been found to be inside the LAN 107 in response to the search instruction, to request the other gateways 30 to return their management information (step S22) (see also FIG. 22).

The gateways 30 that have received the search instruction from the gateway 30a return information indicating their presence (the presence of the gateways 30) inside the LAN 107, to the gateway 30a. Also, the gateways 30 that have received the management information transmission request from the gateway 30a transmit information regarding devices that are under the control of the gateways 30 and information regarding their substitute gateways, to the gateway 30a.

While the search instruction and the management information transmission request are separately transmitted and received in the present example, the present invention is not limited to this example, and a single instruction (signal) that corresponds to both of the search instruction and the management information transmission request may be transmitted and received.

The gateway 30a receives information (response to the management information transmission request) from the gateways 30 (step S23), and transmits (transfers) the information received from the gateways 30 to the management server 50 (step S24) (see also FIG. 22).

The information transmitted from the gateways 30 to the gateway 30a is transferred to the management server 50 by the gateway 30a and additionally stored in the management table 69 (69e) (see FIG. 22) in the management server 50.

The gateway 30b then transitions to the deep sleep mode at an appropriate timing (see FIG. 20).

FIG. 23 illustrates the management table 69 (69e) according to the fifth embodiment. The management table 69e stores the management information 350.

As illustrated in FIG. 23, the management information 350 defines a correspondence relationship (also referred to as a "master relationship" or a "master-slave relationship") between the plurality of gateways 30 and the plurality of devices 10. Specifically, the management information 350 defines information regarding devices 10 that are under the control of the gateways 30. For example, the management information 350 in FIG. 23 defines that the gateway 30a has control over the devices 10a and 10c, and the gateway 30b has control over the device 10b.

The management information 350 also defines a substitute relationship among the plurality of gateways 30 (specifically, a gateway that can substitute as each gateway). For example, the management information 350 in FIG. 23 defines that the gateway 30a can substitute as the gateway 30b.

The management information 350 further defines information regarding whether the gateways 30 currently have message sessions with the management server 50. The management information 350 in FIG. 23 defines that the gateway 30a has a message session with the management server 50, and the gateway 30b has no message session with the management server 50 (because the gateway 30b is in the deep sleep mode). Note that the information regarding the presence or absence of message sessions does not have to be acquired from the gateways 30, and may be acquired and stored in the management table 69 by the management server 50 itself.

In this way, the fifth embodiment describes the example in which the gateway 30b transitions to the deep sleep mode without transmitting an advance substitute request to the gateway 30a.

Additionally, the gateway 30a generates no new message session 513 (see FIG. 7, for example) as a substitute for use on the gateway 30b. Instead, the gateway 30a uses the existing message session 511 to stand by for receipt of a tunnel connection request destined for the gateway 30a and a tunnel connection request destined for the gateway 30b.

5-3. Return from Deep Sleep Mode

Figure 24:
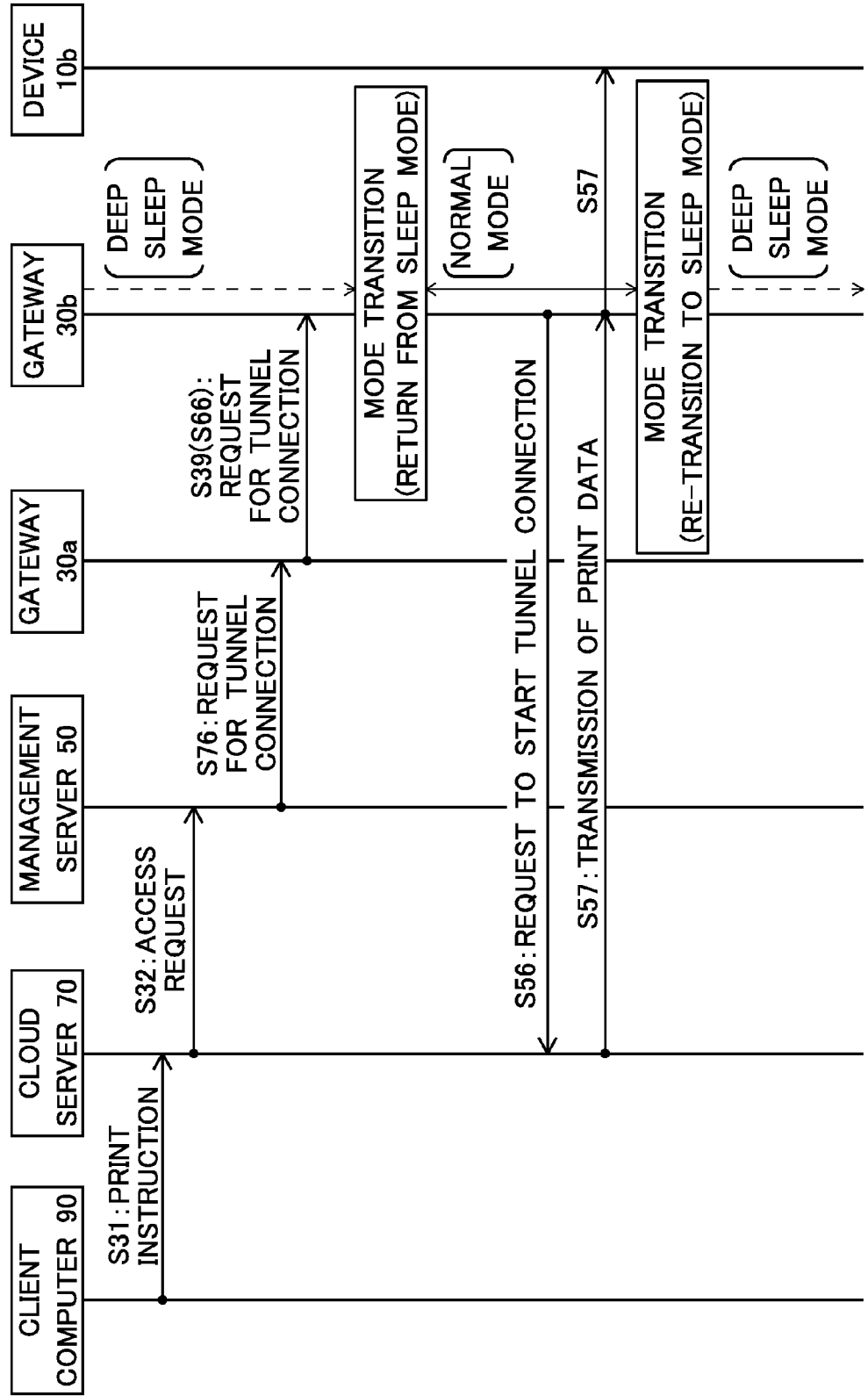
FIG. 24 is a timing chart of operations performed by the communication system when the gateway returns to the deep sleep mode, according to the fifth embodiment.
Figure 25:
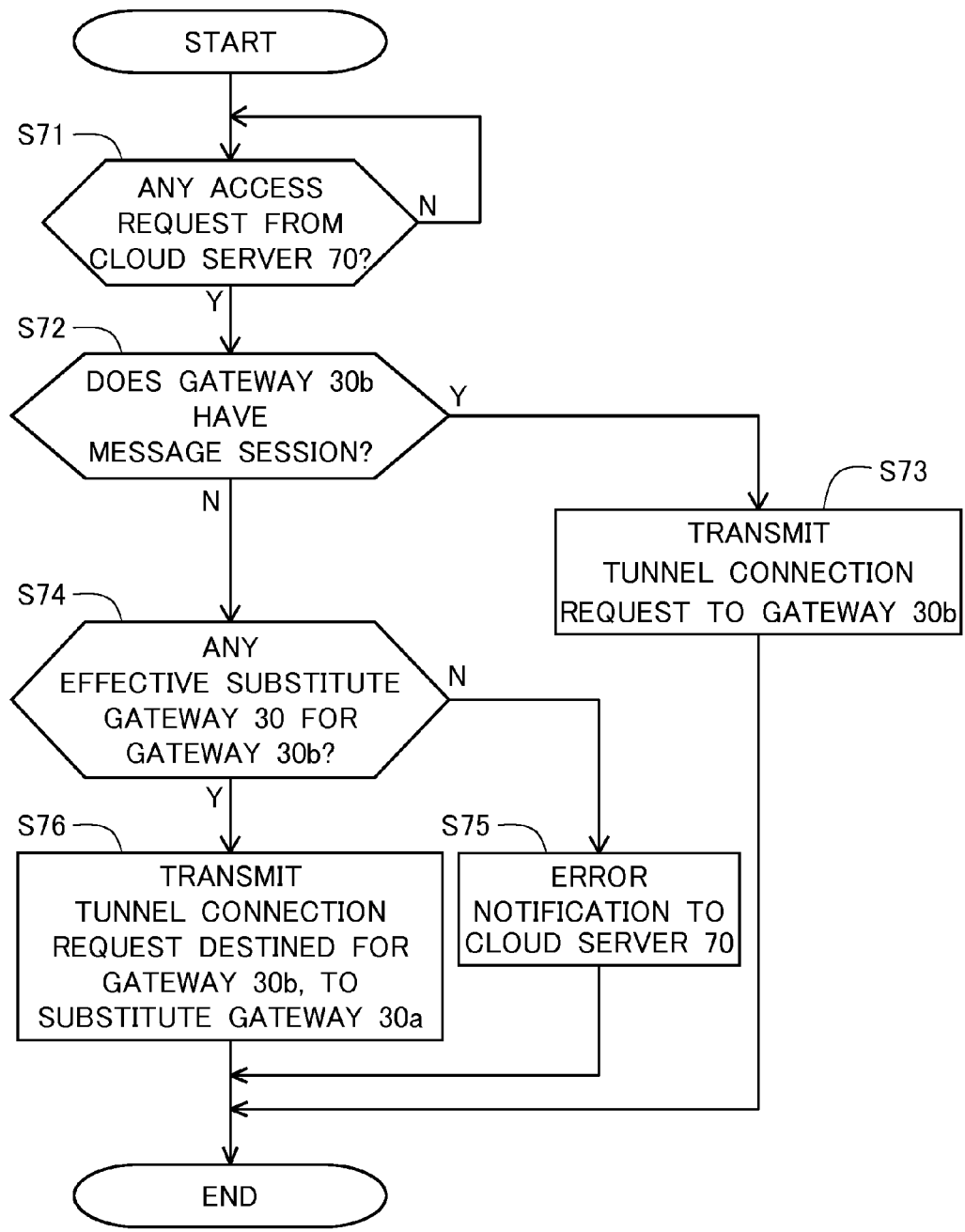
FIG. 25 is a flowchart of some of the operations (operations of the management server) in FIG. 24.
Figure 26:
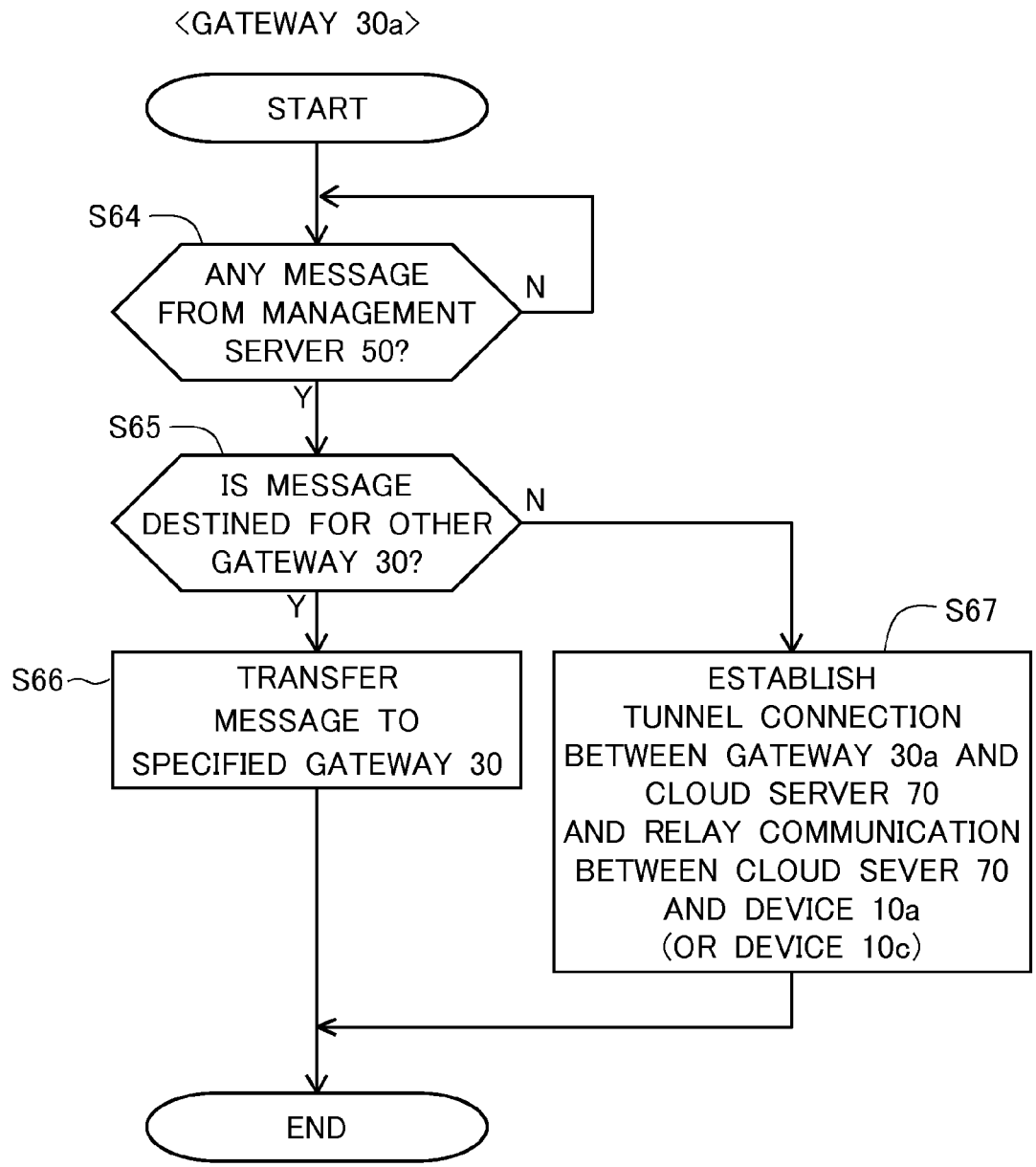
FIG. 26 is a flowchart of some of the operations (operations of the gateway) in FIG. 24.

Next is a description of operations performed by the communication system 1 when the gateway 30b returns from the deep sleep mode (sleep state) to the normal mode (non-sleep state) in response to a request to access the device 10b from the cloud server 70, with reference to FIGS. 24 to 26. FIG. 24 is a timing chart of the operations. FIG. 25 is a flowchart of some of the operations (operations of the management server 50), and FIG. 26 is a flowchart of some of the operations (operations of the gateway 30a).

As illustrated in FIG. 24, steps S31 and S32 are performed as in the first embodiment. In response to this, the management server 50 performs the operations in the flowchart in FIG. 25.

First, if the management server 50 has received from the cloud server 70 an access request based on a cloud print instruction (i.e., a request to access the device 10b serving as a printout destination), the procedure proceeds from step S71 to step S72.

In step S72, the management server 50 determines on the basis of the management information 350 (FIG. 23) that the gateway 30b is a gateway corresponding to the device 10b serving as an access destination, and determines whether the gateway 30b has a message session with the management server 50.

If the gateway 30b has a message session with the management server 50, the management server 50 determined that the gateway 30b is in a non-deep sleep state (e.g., the normal state) and directly transmits a tunnel connection request to the gateway 30b (step S73). Then, tunnel connection is established between the gateway 30b and the cloud server 70 and is used to, for example, transmit data from the cloud server 70 to the device 10b.

On the other hand, if the gateway 30b has no message session with the management server 50, the management server 50 determines that the gateway 30b is in the deep sleep mode, and the procedure proceeds to step S74.

In step S74, the management server 50 determines, on the basis of the management information 350, the presence or absence of any gateway 30 that is connectable to the gateway 30b and that has a message session with the management server 50 (in other words, any effective substitute gateway for the gateway 30b). The management server 50 also determines one effective substitute gateway for the gateway 30b (i.e., the effective substitute gateway 30a corresponding to the specific gateway 30b) on the basis of the management information 350.

If it is determined that there is no effective substitute gateway for the gateway 30b, the management server 50 transmits error information to the cloud server 70 (step S75).

On the other hand, if it is determined that there is any effective substitute gateway for the gateway 30b, the management server 50 transmits a tunnel connection request destined for the gateway 30b to this substitute gateway 30 (here, gateway 30a) (step S76). In other words, the management server 50 transmits a tunnel connection request to the gateway 30a along with a request to transfer the tunnel connection request to the gateway 30b.

The gateway 30a receives the message (tunnel connection request) from the management server 50 via the existing message session 511 (FIG. 22) between the gateway 30a and the management server 50, and the procedure proceeds from step S64 to step S65 (see FIG. 26). Assume here that the message session 511 used to mainly receive a message destined for the gateway 30a has already been established between the gateway 30a and the management server 50. This existing message session 511 is used to receive a tunnel connection request destined for the gateway 30b.

If the received message is determined to be a message destined for the own device (specifically, a tunnel connection request destined for the gateway 30a), the procedure proceeds from step S65 to step S67. In step S67, tunnel connection is established between the gateway 30a and the cloud server 70 and used to, for example, transmit data from the cloud server 70 to the device 10a (or device 10c).

In the present example, it is determined that the message is a tunnel connection request destined for the other gateway 30b, and the procedure proceeds from step S65 to step S66. In step S66, the substitute gateway 30a transfers the tunnel connection request to the gateway 30b (step S39), and the gateway 30b returns from the deep sleep mode to the normal mode, as in the first embodiment. Then, tunnel connection is established between the gateway 30b and the cloud server 70

(step S56; see FIG. 24) and used to, for example, transmit data from the cloud server 70 to the device 10b (step S57). Note that the gateway 30b will again transition to the deep sleep mode after a lapse of a predetermined non-operating period.

The above-described operations can also achieve the same effects as those in the first embodiment.

In particular, according to the above-described operations, the gateway 30a previously acquires the substitute relationship among the plurality of gateways 30 (including the relationship between the gateway 30b and the gateway 30a that substitutes as the gateway 30b) and transfers this substitute relationship to the management server 50 to store the information in the management table 69. Then, the management server 50 that has received a request to access the device 10b from the cloud server 70 determines a gateway (30b) that has control over the device 10b, on the basis of the management information 350 in the management table 69, and also determines that the gateway 30a is a substitute gateway for the gateway 30b. The management server 50 then transmits the tunnel connection request to the substitute gateway 30a along with a request to transfer the tunnel connection request to the gateway 30b. Consequently, the tunnel connection request is transmitted from the management server 50 via the substitute gateway 30a to the gateway 30b.

The above operations eliminate the need for the gateway 30b to transmit an advance substitute request to the substitute gateway 30a before transitioning to the deep sleep mode.

Moreover, the substitute gateway 30a does not have to generate a new message session with the management server 50. The substitute gateway 30a stands by for receipt of a tunnel connection request destined for the gateway 30b and receives the tunnel connection request via the existing message session 511 with the management server 50 (i.e., a message session for the gateway 30a) (see FIG. 22). This enables a further reduction in communication load and more effective use of resources of the gateway 30a and the management server 50 than in the case of generating the new message session 513 (see FIGS. 7 and 10) for use on the gateway 30b between the management server 50 and the gateway 30a. More specifically, it is possible to reduce memory usage in the gateway 30a and the management server 50, for example.

6. Sixth Embodiment

A sixth embodiment is a variation of a combination of the fifth and second embodiments. The following description focuses on differences from the fifth embodiment.

Figure 27:
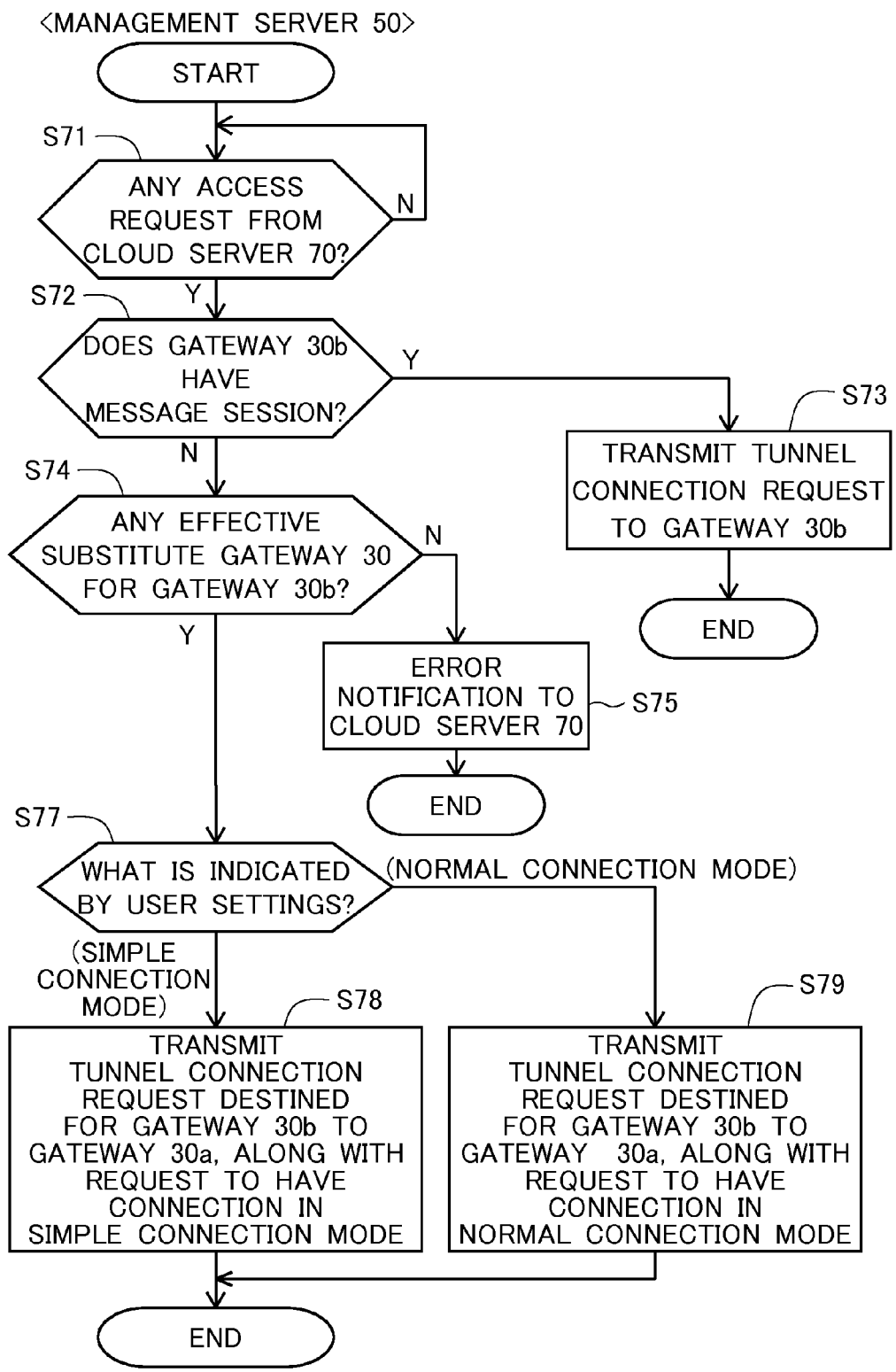
FIG. 27 is a flowchart of operations performed by a management server according to a sixth embodiment.

In the sixth embodiment, the management server 50 performs operations illustrated in the flowchart in FIG. 27, instead of the operations in the flowchart in FIG. 25.

Steps S71 to S75 are the same as those of the fifth embodiment.

If the answer is "YES" in step S74, the procedure proceeds to step S77, instead of step S76.

In step S77, the management server 50 determines the establishment mode (connection mode) of tunnel communication that is specified from the simple connection mode and the normal connection mode according to user settings, and the procedure branches according to a result of the determination. Assume that the user settings regarding the gateway 30b have been transferred to and stored in the management server 50 in advance.

The management server 50 transmits the tunnel connection request to the substitute gateway 30a, along with a request to perform an operation responsive to the tunnel connection request in a mode that is specified from the two modes (the simple connection mode and the normal connection mode) by the user and a request to transfer the tunnel connection request to the gateway 30b.

Specifically, if the specified connection mode of tunnel communication is the simple connection mode, the procedure proceeds to step S78. In step S78, the management server 50 transmits a tunnel connection request destined for the gateway 30b to the substitute gateway 30a, along with information indicating that the connection operation be performed in the simple connection mode (i.e., the information is added to the tunnel connection request). Then, the gateway 30a transfers the tunnel connection request to the gateway 30b (step S66 in FIG. 26), and the gateway 30b performs the tunnel connection operation in the simple connection mode (steps S56 and S57) (see FIGS. 8 and 10).

On the other hand, if the specified connection mode of tunnel communication is the normal connection mode, the procedure proceeds to step S79. In step S79, the management server 50 transmits a tunnel connection request destined for the gateway 30b to the substitute gateway 30a, along with information indicating that the connection operation be performed in the normal connection mode. Then, the gateway 30a transfers the tunnel connection request to the gateway 30b (step S66 in FIG. 26), and the gateway 30b performs the tunnel connection operation in the normal connection mode (steps S53, S54, S55, S56, and S57) (see FIGS. 12 and 14).

The above-described operations can achieve the same effects as those in the second and fifth embodiments.

7. Seventh Embodiment

A seventh embodiment is a variation of a combination of the fifth and third embodiments. The following description focuses on differences from the fifth embodiment.

The seventh embodiment, like the third embodiment, assumes a situation in which the gateways 30a and 30b both have control over a common device 10 (here, device 10b) (see FIGS. 17 and 18). Note that the seventh embodiment is the same as the fifth embodiment (see FIG. 22) and differs from the third embodiment (see FIGS. 17 and 18) in that the message session 513 is not established.

In the seventh embodiment, the management server 50 that has received from the cloud server 70 a request to access the device 10b selects a gateway 30 corresponding to the device 10b out of the two gateways 30a and 30b on the basis of the management information 350. Assume here that the gateway 30b is selected as a gateway corresponding to the device 10b.

If it is determined that there is no message session between the gateway 30b and the management server 50, the management server 50 transmits a tunnel connection request to the substitute gateway 30a. Here, note that the management server 50 determines whether a request to transfer the tunnel connection request to the gateway 30b be added to the tunnel connection request, depending on whether a predetermined condition is satisfied. The predetermined condition in the seventh embodiment is the same as that in the third embodiment.

If the number of current tunnel connections to the gateway 30a has already reached a predetermined upper-limit value, the management server 50 transmits a tunnel connection request to the gateway 30a along with a request to transfer the tunnel connection request to the gateway 30b. In other words, the management server 50 transmits the tunnel connection request to the gateway 30a along with a request to transfer the tunnel connection request to the gateway 30b. In response to this, the gateway 30a transfers the tunnel connection request to the gateway 30b.

On the other hand, if the number of current tunnel connections to the gateway 30a has not yet reached the predetermined upper-limit value, the management server 50 transmits a tunnel connection request to the gateway 30a without a request to transfer the tunnel connection request to the gateway 30b.

Then, a gateway 30 (30a or 30b) that has finally received the tunnel connection request establishes tunnel connection with the cloud server 70, and the established tunnel connection is used to, for example, transmit print target data from the cloud server 70 to the device 10b, which is a transmission destination.

Figure 28:
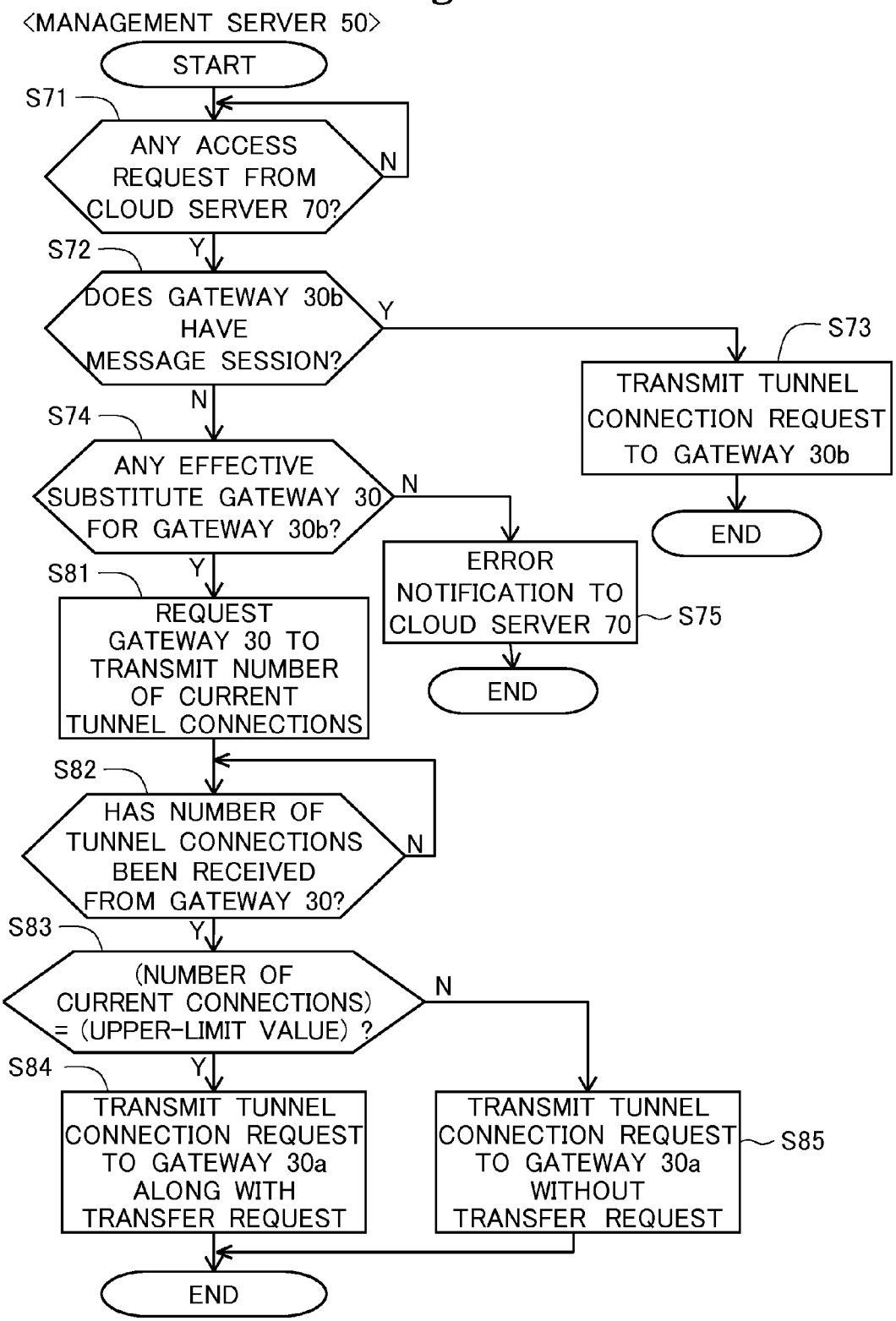
FIG. 28 is a flowchart of operations performed by a management server according to a seventh embodiment.

In the seventh embodiment, the management server 50 performs operations illustrated in the flowchart in FIG. 28, instead of the operations in the flowchart in FIG. 25.

Steps S71 to S75 are the same as those in the fifth embodiment.

If the answer is "YES" in step S74, the procedure proceeds to step S81, instead of step S76.

In step S81, the management server 50 transmits an instruction to return the number of current tunnel connections, to the gateway 30a. In response to the instruction, the gateway 30a returns the number of current tunnel connections to the gateway 30a, to the management server 50. These instruction and response are transmitted and received via the message session 511 (see FIG. 22).

If the management server 50 has received the number of current tunnel connections to the gateway 30a from the gateway 30a, the procedure proceeds from step S82 to step S83.

In step S83, it is determined whether the number of tunnel connections to the gateway 30a has already reached a predetermined upper-limit value (e.g., two), and the procedure branches according to a result of the determination.

If the number of current tunnel connections between the cloud server 70 and the gateway (substitute gateway) 30a has already reached the predetermined upper-limit value (e.g., two), the processing of step S84 is performed. In step S84, the management server 50 transmits a tunnel connection request to the substitute gateway 30a along with a request to transfer the tunnel connection request to the gateway 30b. In other words, the management server 50 transmits the tunnel connection request to the gateway 30a along with the transfer request.

Then, the same processing as that in the above-described first embodiment (see FIG. 8), or in the second embodiment (see FIG. 12), is performed. Specifically, as illustrated in FIG. 17 (see also FIG. 8), the gateway 30a transfers the tunnel connection request received from the management server 50 to the gateway 30b and causes the gateway 30b to return from the deep sleep mode (step S39). Then, the gateway 30b establishes tunnel communication with the cloud server 70 in the simple connection mode (or the normal connection mode) (step S56), and uses the tunnel communication to achieve communication from the cloud server 70 to the device 10 (e.g., device 10b) that is under the control of the gateway 30b, via the gateway 30b (step S57).

On the other hand, if the number of current tunnel connections between the cloud server 70 and the substitute gateway 30a has not yet reached the predetermined upper-limit value, the processing of step S85 (FIG. 28) is performed. In step S85, the management server 50 transmits a tunnel connection request to the gateway 30a without the transfer request. In other words, the management server 50 transmits a tunnel connection request that is to be handled by the gateway 30a itself, to the gateway 30a.

Then, the processing of steps S58 and S59 is performed. Specifically, as illustrated in FIGS. 16 and 18, the gateway 30a establishes new tunnel connection (tunnel communication) with the cloud server 70 (step S58) and relays communication between the cloud server 70 and the device 10b (step S59). In step S59, this new tunnel communication is used to achieve communication from the cloud server 70 to the device 10 (e.g., device 10b) that is under the control of the gateway 30a, via the gateway 30a.

In this way, the management server 50 transmits the tunnel connection request to the gateway 30a without the transfer request, to cause the gateway 30a to establish tunnel communication between the cloud server 70 and the gateway 30a and relay communication between the cloud server 70 and the specific device 10b.

The above-described operations can achieve the same effects as those of the third and fifth embodiments.

8. Eighth Embodiment

An eighth embodiment is a variation of a combination of the fifth and fourth embodiments. The following description focuses on differences from the fifth embodiment.

The eighth embodiment, like the fourth embodiment, assumes a situation in which the gateways 30a and 30b both have control over a common device 10 (here, device 10b) (sees FIGS. 17 and 18). The eighth embodiment is the same as the fifth embodiment (FIG. 22) and differs from the fourth embodiment in that the message session 513 is not established.

In the eighth embodiment, the management server 50 that has received a request to access the device 10b from the cloud server 70 selects a gateway 30 corresponding to the device 10b out of the two gateways 30a and 30b on the basis of the management information 350. Assume here that the gateway 30b is selected as a gateway corresponding to the device 10b.

Then, if it is determined that there is no message session between the gateway 30b and the management server 50, the management server 50 transmits a tunnel connection request to the substitute gateway 30a. Here, note that the management server 50 determines whether a request to transfer the tunnel connection request to the gateway 30b be added to the tunnel connection request, depending on whether a predetermined condition is satisfied. The predetermined condition in the eighth embodiment is the same as that in the fourth embodiment.

If it is determined that the security level of the substitute gateway 30a is lower than that of the gateway 30b, the management server 50 transmits a tunnel connection request to the gateway 30a along with a request to transfer the tunnel connection request to the gateway 30b. In other words, the management server 50 transmits the tunnel connection request to the gateway 30a along with a request to transfer the tunnel connection request to the gateway 30b. In response to this tunnel connection request, the gateway 30a transfers the tunnel connection request to the gateway 30b.

On the other hand, if it is determined that the security level of the substitute gateway 30a is equal to or higher than that of the gateway 30b, the management server 50 transmits a tunnel connection request to the gateway 30a without a request to transmit the tunnel connection request to the gateway 30b.

Then, a gateway 30 (30a or 30b) that has finally received the tunnel connection request establishes tunnel connection with the cloud server 70, and the established tunnel connection is used to, for example, transmit print target data from the cloud server 70 to the device 10b serving as a transmission destination.

Figure 29:
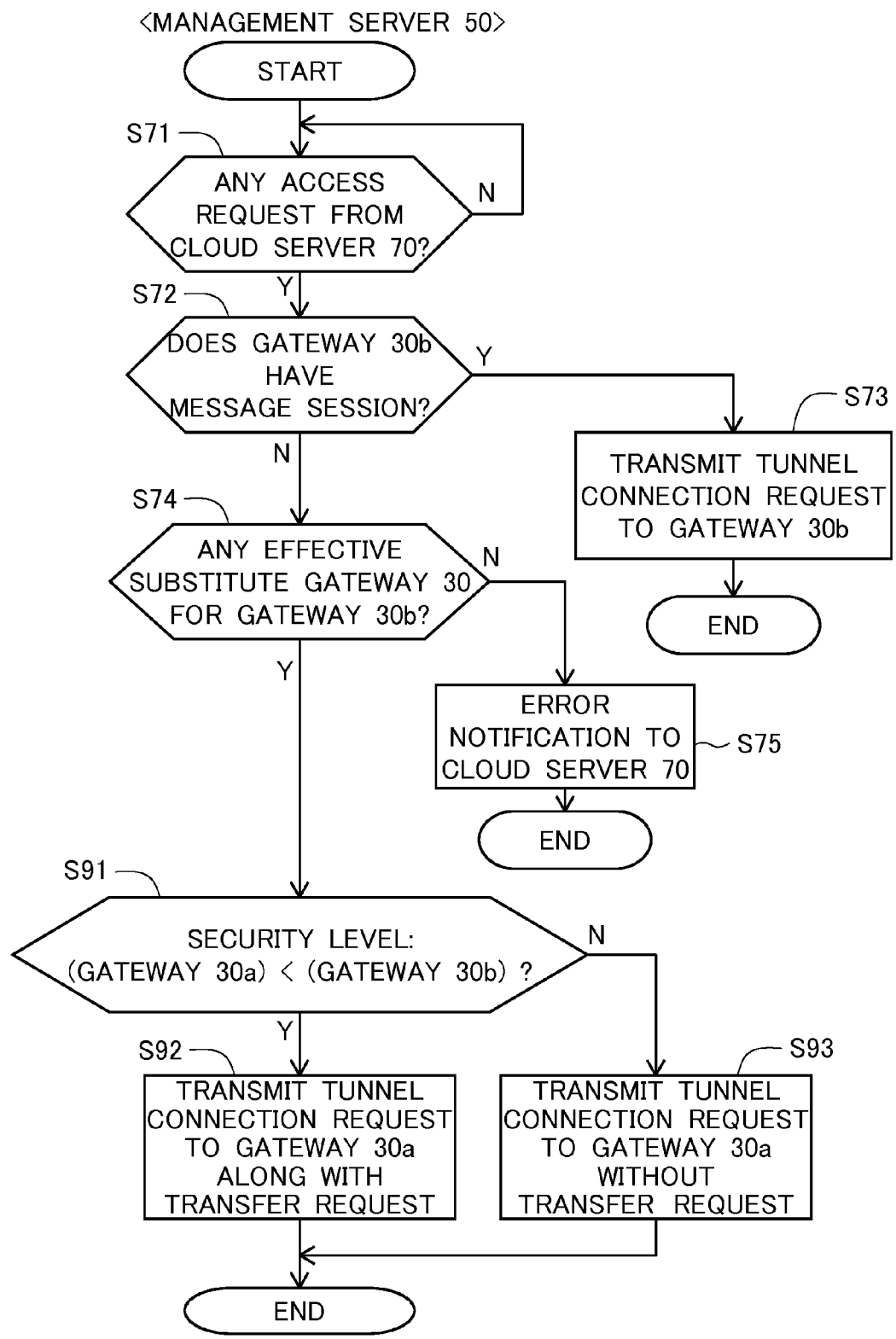
FIG. 29 is a flowchart of operations performed by a management server according to an eighth embodiment.

In the eighth embodiment, the management server 50 performs operations illustrated in the flowchart in FIG. 29, instead of the operations in the flowchart in FIG. 25.

Steps S71 to S75 are the same as those in the fifth embodiment.

If the answer is "YES" in step S74, the procedure proceeds to step S91, instead of step S76.

In step S91, the hierarchy of the security levels of the substitute gateway 30a and the gateway 30b is determined, and the procedure branches according to a result of the determination.

Assume here that information regarding the security levels of the gateways 30 is transmitted in advance from the gateways 30 to the management server 50 via the gateway 30a in steps S23 and S24 (see FIGS. 20 and 21).

If it is determined that the security level of the substitute gateway 30a is lower than that of the gateway 30b, the processing of step S92 is performed. In step S92, the management server 50 transmits a tunnel connection request to the substitute gateway 30a along with a request to transfer the tunnel connection request to the gateway 30b. In other words, the management server 50 transmits the tunnel connection request to the gateway 30a along with the transfer request.

Then, the same processing as in the above-described first embodiment (see FIG. 8), or in the second embodiment (see FIG. 12), is performed. Specifically, as illustrated in FIG. 17 (see also FIG. 8), the gateway 30a transfers the tunnel connection request received from the management server 50 to the gateway 30b and causes the gateway 30b to return from the deep sleep mode (step S39). Then, the gateway 30b establishes tunnel communication with the cloud server 70 in the simple connection mode (or the normal connection mode) (step S56), and uses the tunnel communication to achieve communication from the cloud server 70 to the device 10 (e.g., device 10b) that is under the control of the gateway 30b, via the gateway 30b (step S57).

On the other hand, if the security level of the substitute gateway 30a is higher than or equal to that of the gateway 30b, the processing of step S93 (FIG. 29) is performed. In step S93, the management server 50 transmits a tunnel connection request to the gateway 30a without the transfer request. In other words, the management server 50 transmits a tunnel connection request that is to be handled by the gateway 30a itself, to the gateway 30a.

Then, the processing of steps S58 and S59 is performed. Specifically, as illustrated in FIGS. 16 and 18, the gateway 30a establishes new tunnel connection (tunnel communication) with the cloud server 70 (step S58) and relays communication between the cloud server 70 and the gateway 30a (step S59). In step S59, this new tunnel communication is used to achieve communication from the cloud server 70 to the device 10 (e.g., device 10b) that is under the control of the gateway 30a, via the gateway 30a.

The above-described operations can achieve the same effects as those of the fourth and fifth embodiments.

9. Variations

While the above has been a description of embodiments of the present invention, the invention is not intended to be limited to the examples described above.

For example, while the above-described embodiments take the example of the case where the gateways 30 are MFPs, the present invention is not limited to this example, and the gateways 30 may be other devices, including single-function printers and personal computers.

While the above-described embodiments take the example of the case where the devices 10 are MFPs, the present invention is not limited to this example, and the devices 10 may be other devices, including single-function printers and personal computers.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

The invention claimed is:

1. A communication system comprising:
   a plurality of devices that are provided inside a predetermined LAN;
   a plurality of communication relay apparatuses that are provided inside the predetermined LAN and relay communication between the plurality of devices and a cloud server provided outside the predetermined LAN; and
   a management server that are provided outside the predetermined LAN and receives from the cloud server an access request to access a specific device among the plurality of devices,
   wherein the plurality of communication relay apparatuses include:
   a specific communication relay apparatus that is capable of transitioning to a power saving mode and has control over the specific device, the power saving mode being a mode in which the communication relay apparatus has no communication session with the management server; and
   a substitute communication relay apparatus that receives, in place of the specific communication relay apparatus, a tunnel connection request to establish tunnel connection with the cloud server, via a communication session between the substitute communication relay apparatus and the management server,
   in a case where the management server has received the access request from the cloud server and there is no communication session between the specific communication relay apparatus and the management server, the management server transmits the tunnel connection request to the substitute communication relay apparatus via a communication session between the substitute communication relay apparatus and the management server,
   the substitute communication relay apparatus that has received the tunnel connection request from the management server transfers the tunnel connection request to the specific communication relay apparatus and causes the specific communication relay apparatus to return from the power saving mode, and
   the specific communication relay apparatus that has returned from the power saving mode establishes tunnel communication with the cloud server in response to the tunnel connection request received from the substitute communication relay apparatus, and relays communication between the cloud server and the specific device.

2. The communication system according to claim 1, wherein
   the specific communication relay apparatus transmits, to the substitute communication relay apparatus, an advance substitute request to receive the tunnel connection request in place of the specific communication relay apparatus and to transfer the tunnel connection request to the specific communication relay apparatus, before transitioning to the power saving mode, and the substitute communication relay apparatus transfers substitute information based on the advance substitute request to the management server.

3. The communication system according to claim 2, wherein the substitute communication relay apparatus that has received the advance substitute request from the specific communication relay apparatus generates a new communication session with the management server, the new communication session being different from an existing communication session with the management server, and stands by for receipt of the tunnel connection request that is destined for the specific communication relay apparatus.

4. The communication system according to claim 1, wherein the specific communication relay apparatus includes:

an information collecting unit configured to collect information regarding a device that is under control of the specific communication relay apparatus after return from the power saving mode; and a communication control unit configured to, on condition that it is determined on the basis of the information collected by the information collecting unit that the specific device is in normal operation, establish a new communication session between the specific communication relay apparatus and the management server, receiving a new tunnel connection request from the management server via the new communication session, and establish the tunnel communication with the cloud server in response to the new tunnel connection request to relay communication between the cloud server and the specific device.

5. The communication system according to claim 1, wherein the specific communication relay apparatus includes:

a communication control unit configured to establish the tunnel communication in response to the tunnel connection request transferred from the substitute communication relay apparatus, to relay communication between the cloud server and the specific device.

6. The communication system according to claim 1, wherein the specific communication relay apparatus includes:

an information collecting unit configured to collect information regarding a device that is under control of the specific communication relay apparatus; and a communication control unit configured to establish tunnel communication with the cloud server to relay communication between the cloud server and the specific device, the communication control unit has two connection modes:

a normal connection mode in which, on condition that it is determined on the basis of the information collected by the information collecting unit that the specific device is in normal operation, the communication control unit establishes a new communication session between the specific communication relay apparatus and the management server, receives a new tunnel connection request from the management server via the new communication session, and establishes the tunnel communication in response to the new tunnel connection request to relay communication between the cloud server and the specific device; and a simple connection mode in which the communication control unit establishes the tunnel communication in response to the tunnel connection request transferred from the substitute communication relay apparatus to relay communication between the cloud server and the specific device, and the communication control unit performs an operation based on the tunnel connection request in a mode that is selected out of the normal connection mode and the simple connection mode by a user.

7. The communication system according to claim 1, wherein the specific device is under control of both of the specific communication relay apparatus and the substitute communication relay apparatus, and the substitute communication relay apparatus that has received the tunnel connection request from the management server is configured to:

if the number of current tunnel connections between the cloud server and the substitute communication relay apparatus has already reached a predetermined upper-limit value, transfer the tunnel connection request to the specific communication relay apparatus and cause the specific communication relay apparatus to establish the tunnel connection between the cloud server and the specific communication relay apparatus, and if the number of current tunnel connections has not yet reached the predetermined upper-limit value, establish tunnel communication between the cloud server and the substitute communication relay apparatus to relay communication between the cloud server and the specific device.

8. The communication system according to claim 1, wherein the specific device is under control of both of the specific communication relay apparatus and the substitute communication relay apparatus, and the substitute communication relay apparatus that has received the tunnel connection request from the management server is configured to:

if the security level of the substitute communication relay apparatus is lower than the security level of the specific communication relay apparatus, transfer the tunnel connection request to the specific communication relay apparatus and cause the specific communication relay apparatus to establish the tunnel communication between the cloud server and the specific communication relay apparatus, and if the security level of the substitute communication relay apparatus is higher than the security level of the specific communication relay apparatus, establish tunnel communication between the cloud server and the substitute communication relay apparatus to relay communication between the cloud server and the specific device.

9. The communication system according to claim 1, wherein the substitute communication relay apparatus includes:

an information collecting unit configured to acquire management information that includes substitute information regarding a substitute relationship among the plurality of communication relay apparatuses, through communication with another communication relay apparatus provided inside the predetermined LAN; and a communication unit configured to transmit the management information to the management server, in a case where the management server has received from the cloud server the access request to access the specific device and there is no communication session between the management server and the specific communication relay apparatus, the management server determines that the specific communication relay apparatus is in the power saving mode, determines the substitute communication relay apparatus corresponding to the specific communication relay apparatus on the basis of the management information, and transmits the tunnel connection request to the substitute communication relay apparatus along with a request to transfer the tunnel connection request to the specific communication relay apparatus.

10. The communication system according to claim 9, wherein
the substitute communication relay apparatus uses an existing communication session between the substitute communication relay apparatus and the management server without generating a new communication session with the management server, and stands by for receipt of the tunnel connection request that is destined for the specific communication relay apparatus.

11. The communication system according to claim 9, wherein
the specific communication relay apparatus has two connection modes:
a normal connection mode in which, on condition that the specific device is determined to be in normal operation, the specific communication relay apparatus establishes a new communication session with the management server, receives a new tunnel connection request from the management server via the new communication session, and establishes the tunnel communication in response to the new tunnel connection request to relay communication between the cloud server and the specific device; and
a simple connection mode in which the specific communication relay apparatus establishes the tunnel communication in response to receipt of the tunnel connection request to relay communication between the cloud server and the specific device, and
the management server transmits the tunnel connection request to the substitute communication relay apparatus along with information indicating that the specific communication relay apparatus is to perform an operation based on the tunnel connection request in a predetermined mode that is selected out of the two connection modes by a user.

12. The communication system according to claim 9, wherein
the specific device is under control of both of the specific communication relay apparatus and the substitute communication relay apparatus, and
the management server is configured to:
determine the substitute communication relay apparatus corresponding to the specific communication relay apparatus on the basis of the management information, and receive the number of current tunnel connections between the cloud server and the substitute communication relay apparatus from the substitute communication relay apparatus;
if the number of current tunnel connections has already reached a predetermined upper-limit value, transmit the tunnel connection request to the substitute communication relay apparatus along with a request to transfer the tunnel connection request to the specific communication relay apparatus, and cause the specific communication relay apparatus to establish the tunnel communication between the cloud server and the specific communication relay apparatus; and
if the number of current tunnel connections has not yet reached the predetermined upper-limit value, transmit the tunnel connection request to the substitute communication relay apparatus and cause the substitute communication relay apparatus to establish tunnel communication between the cloud server and the substitute communication relay apparatus to relay communication between the cloud server and the specific device.

13. The communication system according to claim 9, wherein
the specific device is under control of both of the specific communication relay apparatus and the substitute communication relay apparatus, and
the management server is configured to:
determine the substitute communication relay apparatus corresponding to the specific communication relay apparatus on the basis of the management information and acquire security levels of the substitute communication relay apparatus and the specific communication relay apparatus;
if the security level of the substitute communication relay apparatus is lower than the security level of the specific communication relay apparatus, transmit the tunnel connection request to the substitute communication relay apparatus along with a request to transfer the tunnel connection request to the specific communication relay apparatus, and cause the specific communication relay apparatus to establish the tunnel communication between the cloud server and the specific communication relay apparatus; and
if the security level of the substitute communication relay apparatus is higher than the security level of the specific communication relay apparatus, transmit the tunnel connection request to the substitute communication relay apparatus and cause the substitute communication relay apparatus to establish tunnel communication between the cloud server and the substitute communication relay apparatus to relay communication between the cloud server and the specific device.

14. The communication system according to claim 1, wherein
the specific communication relay apparatus is an image forming apparatus.

15. A management server that manages communication between a cloud server provided outside a predetermined LAN and a specific device provided inside the predetermined LAN in a communication system that establishes communication between the cloud server and the specific device via one of a plurality of communication relay apparatuses that are provided inside the predetermined LAN,
the management server comprising:
a receiving unit configured to receive from the cloud server an access request to access the specific device; and
a communication control unit configured to transmit a tunnel connection request to establish tunnel communication with the cloud server in response to the access request,
wherein, if the management server has received the access request and there is no communication session between the management server and a specific communication relay apparatus that corresponds to the specific device, the communication control unit transmits the tunnel connection request to a substitute communication relay apparatus different from the specific communication relay apparatus via a communication session between the substitute communication relay apparatus and the management server, and causes the substitute communication relay apparatus to transfer the tunnel connection request to the specific communication relay apparatus.

16. The management server according to claim 15, further comprising:
a storage unit configured to store management information that includes substitute information regarding a substitute relationship among the plurality of communication relay apparatuses,
wherein, if the management server has received from the cloud server the access request to access the specific device and there is no communication session between the management server and the specific communication relay apparatus, the communication control unit determines that the specific communication relay apparatus is in a power saving mode, determines the substitute communication relay apparatus corresponding to the specific communication relay apparatus on the basis of the management information, and transmits the tunnel connection request to the substitute communication relay apparatus along with a request to transfer the tunnel connection request to the specific communication relay apparatus.

17. The management server according to claim 15, wherein the specific communication relay apparatus has two connection modes:
a normal connection mode in which, on condition that the specific device is determined to be in normal operation, the specific communication relay apparatus establishes a new communication session with the management server, receives a new tunnel connection request from the management server via the new communication session, and establishes the tunnel communication in response to the new tunnel connection request to relay communication between the cloud server and the specific device; and
a simple connection mode in which the specific communication relay apparatus establishes the tunnel communication in response to receipt of the tunnel connection request to relay communication between the cloud server and the specific device, and
the communication control unit transmits the tunnel connection request to the substitute communication relay apparatus, along with a request to perform an operation based on the tunnel connection request in a predetermined mode that is selected out of the two connection modes by a user and a request to transfer the tunnel connection request to the specific communication relay apparatus.

18. The management server according to claim 15, further comprising:
a storage unit configured to store management information that includes substitute information regarding a substitute relationship among the plurality of communication relay apparatuses,
wherein the specific device is under control of both of the specific communication relay apparatus and the substitute communication relay apparatus, and
the communication control unit is configured to:
determine the substitute communication relay apparatus corresponding to the specific communication relay apparatus on the basis of the management information, and receive from the substitute communication relay apparatus the number of current tunnel connections between the cloud server and the substitute communication relay apparatus;
if the number of current tunnel connections has already reached a predetermined upper-limit value, transmit the tunnel connection request to the substitute communication relay apparatus along with a request to transfer the tunnel connection request to the specific communication relay apparatus, and cause the specific communication relay apparatus to establish the tunnel communication between the cloud server and the specific communication relay apparatus; and
if the number of current tunnel connections has not yet reached the predetermined upper-limit value, transmit the tunnel connection request to the substitute communication relay apparatus and cause the substitute communication relay apparatus to establish tunnel communication between the cloud server and the substitute communication relay apparatus to relay communication between the cloud server and the specific device.

19. The management server according to claim 15, further comprising:
a storage unit configured to store management information that includes substitute information regarding a substitute relationship among the plurality of communication relay apparatuses,
wherein the specific device is under control of both of the specific communication relay apparatus and the substitute communication relay apparatus, and
the communication control unit is configured to:
determine the substitute communication relay apparatus corresponding to the specific communication relay apparatus on the basis of the management information, and acquire security levels of the substitute communication relay apparatus and the specific communication relay apparatus;
if the security level of the substitute communication relay apparatus is lower than the security level of the specific communication relay apparatus, transmit the tunnel connection request to the substitute communication relay apparatus along with a request to transfer the tunnel connection request to the specific communication relay apparatus, and cause the specific communication relay apparatus to establish the tunnel communication between the cloud server and the specific communication relay apparatus; and
if the security level of the substitute communication relay apparatus is higher than the security level of the specific communication relay apparatus, transmit the tunnel connection request to the substitute communication relay apparatus and cause the substitute communication relay apparatus to establish tunnel communication between the cloud server and the substitute communication relay apparatus to relay communication between the cloud server and the specific device.

20. A non-transitory computer-readable recording medium that stores a program for causing a computer built into a management server, which manages communication between a cloud server provided outside a predetermined LAN and a specific device provided inside the predetermined LAN in a communication system that establishes communication between the cloud server and the specific device via one of a plurality of communication relay apparatuses provided inside the predetermined LAN, to execute:
a) receiving from the cloud server an access request to access the specific device; and b) transmitting a tunnel connection request to establish tunnel communication with the cloud server in response to the access request, the operation b) including:

if there is no communication session between the specific communication relay apparatus and the management server at a time of receipt of the access request, transmitting the tunnel connection request to a substitute communication relay apparatus different from the specific communication relay apparatus via a communication session between the substitute communication relay apparatus and the management server, and causing the substitute communication relay apparatus to transfer the tunnel connection request to the specific communication relay apparatus.

21. A communication relay apparatus that acts as a substitute to perform part of an operation of a specific communication relay apparatus provided inside a predetermined LAN in a communication system that uses a management server provided outside the predetermined LAN and the specific communication relay apparatus to establish communication between a cloud server provided outside the predetermined LAN and a specific device provided inside the predetermined LAN, the communication relay apparatus comprising:

a receiving unit configured to, in a case where the specific communication relay apparatus is in a power saving mode, receive a tunnel connection request that is destined for the specific communication relay apparatus and transmitted from the management server in response to an access request to access the specific device from the cloud server; and a communication control unit configured to, upon receipt of the tunnel connection request transmitted from the management server via a communication session between the communication relay apparatus and the management server, transfer the tunnel connection request to the specific communication relay apparatus and cause the specific communication relay apparatus to return from the power saving mode and establish tunnel communication with the cloud server to relay communication between the cloud server and the specific device.

22. The communication relay apparatus according to claim 21, wherein the communication control unit receives from the specific communication relay apparatus an advance substitute request to receive the tunnel connection request in place of the specific communication relay apparatus and transfer the tunnel connection request to the specific communication relay apparatus, and transfers substitute information based on the advance substitute request to the management server.

23. The communication relay apparatus according to claim 21, wherein the specific device is under control of both of the specific communication relay apparatus and the communication relay apparatus, and the communication relay apparatus is configured to:

if the number of current tunnel connections between the cloud server and the communication relay apparatus has already reached a predetermined upper-limit value, transfer the tunnel connection request to the specific communication relay apparatus and cause the specific communication relay apparatus to establish the tunnel communication between the cloud server and the specific communication relay apparatus; and if the number of current tunnel connections has not yet reached the predetermined upper-limit value, establish tunnel communication between the cloud server and the communication relay apparatus to relay communication between the cloud server and the specific device.

24. The communication relay apparatus according to claim 21, wherein the specific device is under control of both of the communication relay apparatus and the specific communication relay apparatus, and the communication relay apparatus is configured to:

if the security level of the communication relay apparatus is lower than the security level of the specific communication relay apparatus, transfer the tunnel connection request to the specific communication relay apparatus and cause the specific communication relay apparatus to establish the tunnel communication between the cloud server and the specific communication relay apparatus; and if the security level of the communication relay apparatus is higher than the security level of the specific communication relay apparatus, establish tunnel communication between the cloud server and the communication relay apparatus to relay communication between the cloud server and the specific device.

25. A non-transitory computer-readable recording medium that stores a program for causing a computer built into a communication relay apparatus, which acts as a substitute to perform part of an operation of a specific communication relay apparatus provided inside a predetermined LAN in a communication system that uses a management server provided outside the predetermined LAN and the specific communication relay apparatus to establish communication between a cloud server provided outside the predetermined LAN and a specific device provided inside the predetermined LAN, to execute:

a) receiving from the cloud server a tunnel connection request that is destined for the specific device and transmitted from the management server that has received an access request to access the specific device; and b) in a case where the specific communication relay apparatus is in a power saving mode and the tunnel connection request that is destined for the specific communication relay apparatus is transmitted from the management server that has received an access request to access the specific device, transmitting the tunnel connection request to the specific communication relay apparatus and causing the specific communication relay apparatus to return from the power saving mode and establish tunnel communication with the cloud server to relay communication between the cloud server and the specific device.

26. A communication relay apparatus in a communication system that uses a management server provided outside a predetermined LAN and the communication relay apparatus provided inside the predetermined LAN to establish communication between a cloud server provided outside the predetermined LAN and a specific device provided inside the predetermined LAN, the communication relay apparatus comprising:

an operation control unit configured to control an operating mode of the communication relay apparatus, the operating mode including a normal mode and a power saving mode that requires lower power consumption than the normal mode; and a communication control unit configured to transmit an advance substitute request to a substitute communication relay apparatus different from the communication relay apparatus before transition to the power saving mode, the advance substitute request being a request to receive a tunnel connection request in place of the communication relay apparatus and transfer the tunnel connection request to the communication relay apparatus, the tunnel connection request being a request to establish tunnel connection with the cloud server.

27. A non-transitory computer-readable recording medium that stores a program for causing a computer built into a communication relay apparatus in a communication system, which uses a management server provided outside a predetermined LAN and the communication relay apparatus provided inside the predetermined LAN to establish communication between a cloud server provided outside the predetermined LAN and a specific device provided inside the predetermined LAN, to execute:

a) transmitting an advance substitute request to a substitute communication relay apparatus different from the communication relay apparatus, the advance substitute request being a request to receive a tunnel connection request in place of the communication relay apparatus and transfer the tunnel connection request to the communication relay apparatus, the tunnel connection request being a request to establish tunnel connection with the cloud server; and b) after the operation a), causing the operating mode of the communication relay apparatus to transition to a power saving mode that requires lower power consumption than in a normal mode.

* * * * *